(12) United States Patent
Matsuoka et al.

(10) Patent No.: US 10,938,106 B2
(45) Date of Patent: Mar. 2, 2021

(54) ELECTRONIC APPARATUS

(71) Applicant: Panasonic Intellectual Property Management Co., Ltd., Osaka (JP)

(72) Inventors: Yasuharu Matsuoka, Osaka (JP); Kazuya Nakano, Osaka (JP); Kenji Nishikawa, Hyogo (JP); Keita Endo, Osaka (JP); Shintarou Tanaka, Osaka (JP); Ryo Yonezawa, Kyoto (JP); Kazuki Zusho, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/799,507

(22) Filed: Feb. 24, 2020

(65) Prior Publication Data

US 2020/0194891 A1 Jun. 18, 2020

Related U.S. Application Data

(60) Division of application No. 15/820,228, filed on Nov. 21, 2017, which is a continuation of application No. PCT/JP2016/004512, filed on Oct. 7, 2016.

(30) Foreign Application Priority Data

Oct. 30, 2015 (JP) .............................. JP2015-214879

(51) Int. Cl.
*H01Q 1/22* (2006.01)
*H01Q 5/35* (2015.01)
(Continued)

(52) U.S. Cl.
CPC ............. *H01Q 5/35* (2015.01); *H01Q 1/2266* (2013.01); *H01Q 1/2291* (2013.01); *H01Q 1/24* (2013.01);
(Continued)

(58) Field of Classification Search
CPC .... H01Q 1/2266; H01Q 1/2291; H01Q 1/243; H01Q 5/35–5/378
See application file for complete search history.

(56) References Cited

U.S. PATENT DOCUMENTS 6,054,962 A * 4/2000 Ha .................... H01Q 5/321
343/722
7,079,079 B2 * 7/2006 Jo ..................... H01Q 1/243
343/700 MS
(Continued)

FOREIGN PATENT DOCUMENTS

JP 2005-136912 A 5/2005
JP 2008-245132 A 10/2008
(Continued)

OTHER PUBLICATIONS

International Search Report for corresponding International Application No. PCT/JP2016/004512 dated Dec. 27, 2016.

*Primary Examiner* — Hasan Z Islam
(74) *Attorney, Agent, or Firm* — Renner, Otto, Boisselle & Sklar, LLP

(57) ABSTRACT

An electronic apparatus includes: a first antenna board having a plate shape and extending with a first length; a second antenna board having a plate shape and extending with a second length; and a rectangular parallelepiped upper casing for accommodating the first antenna board and the second antenna board. The first antenna board and the second antenna board are arranged such that a longitudinal direction of the first antenna board and a longitudinal direction of the second antenna board are parallel to one side of one main surface of the rectangular parallelepiped upper casing. The first antenna board and the second antenna board are arranged parallel to each other.

12 Claims, 17 Drawing Sheets

(51) Int. Cl.
     *H01Q 21/28*    (2006.01)
     *H01Q 1/36*     (2006.01)
     *H01Q 1/38*     (2006.01)
     *H01Q 1/48*     (2006.01)
     *H04B 1/00*     (2006.01)
     *H01Q 5/378*    (2015.01)
     *H01Q 1/24*     (2006.01)
     *H01Q 5/10*     (2015.01)
     *H04B 1/3827*   (2015.01)

(52) U.S. Cl.
     CPC ............... *H01Q 1/36* (2013.01); *H01Q 1/38* (2013.01); *H01Q 1/48* (2013.01); *H01Q 5/10* (2015.01); *H01Q 5/378* (2015.01); *H01Q 21/28* (2013.01); *H04B 1/0064* (2013.01); *H04B 1/3827* (2013.01)

(56) References Cited

U.S. PATENT DOCUMENTS

| | | | |
|---|---|---|---|
| 7,782,261 B2* | 8/2010 | An | H01Q 9/0442 343/702 |
| 8,144,072 B2* | 3/2012 | Chiang | H01Q 1/2266 343/700 MS |
| 9,692,140 B2* | 6/2017 | Hamabe | H01Q 21/0075 |
| 2002/0190905 A1 | 12/2002 | Flint et al. | |
| 2003/0222823 A1 | 12/2003 | Flint et al. | |
| 2005/0093753 A1 | 5/2005 | Masaki | |
| 2005/0104788 A1* | 5/2005 | Hung | H01Q 9/42 343/702 |
| 2008/0252536 A1* | 10/2008 | Anguera | H01Q 1/243 343/702 |
| 2009/0295648 A1 | 12/2009 | Dorsey | |
| 2009/0315788 A1 | 12/2009 | Hirota | |
| 2011/0163937 A1 | 7/2011 | Jung et al. | |
| 2012/0256800 A1 | 10/2012 | Kuonanoja et al. | |
| 2013/0342425 A1 | 12/2013 | Wong | |
| 2014/0009342 A1 | 1/2014 | Wei | |
| 2014/0078001 A1 | 3/2014 | Matsuoka et al. | |
| 2014/0292590 A1* | 10/2014 | Yoo | H01Q 1/243 343/702 |

FOREIGN PATENT DOCUMENTS

| | | | |
|---|---|---|---|
| JP | 4184956 B2 | 11/2008 | |
| JP | 2014-075773 A | 4/2014 | |

* cited by examiner

ELECTRONIC APPARATUS

This is a division of U.S. patent application Ser. No. 15/820,228, filed on Nov. 21, 2017, which is a continuation of International Application No. PCT/JP2016/004512, filed on Oct. 7, 2016, and claims priority to Japanese Patent Application No. 2015-214879, filed on Oct. 30, 2015, the entire disclosures of which are incorporated herein by reference.

BACKGROUND

1. Technical Field

The present disclosure relates to an electronic apparatus where a plurality of antennas are disposed in a casing.

2. Description of Related Art

Among electronic apparatuses capable of performing wireless communication, there have been known an electronic apparatus where a plurality of antennas are disposed in a casing of the electronic apparatus for realizing spatial diversity (see Unexamined Japanese Patent Publication No. 2005-136912 and Japanese Patent Publication No. 4184956). Further, to enable communication by a plurality of wireless communication methods (for example, Long Term Evolution: LTE, Wi-Fi and the like), there has been also known an electronic apparatus where a plurality of antennas which are respectively operated in a plurality of frequency bands corresponding to the respective wireless communication methods are disposed in a casing of the electronic apparatus.

SUMMARY

An electronic apparatus according to the present disclosure includes: a first antenna board having a plate shape and extending with a first length; a second antenna board having a plate shape and extending with a second length; and a casing, having a rectangular parallelepiped shape, for accommodating the first antenna board and the second antenna board. The first antenna board and the second antenna board are arranged such that a longitudinal direction of the first antenna board and a longitudinal direction of the second antenna board are parallel to one side of one main surface of the casing. The first antenna board and the second antenna board are arranged parallel to each other.

According to the electronic apparatus according to the present disclosure, the first antenna board and the second antenna board are arranged parallel to each other and hence, the casing can be made compact compared to a case where the first antenna board and the second antenna board are arranged in series in a row without being arranged parallel to each other. In this manner, according to the electronic apparatus of the present disclosure, it is possible to prevent the increase in a size of the casing even when a plurality of antenna boards are accommodated in the casing.

DETAILED DESCRIPTION

Hereinafter, exemplary embodiments will be described in detail with reference to drawings as appropriate. However, detailed description more than necessary may be omitted. For example, in some cases, a detailed description of a matters which is already known, and a repeated description of substantially the same configuration will be omitted. These omissions are made to avoid unnecessary redundancy of the following description and to facilitate the understanding of those skilled in the art.

Note that the inventor of the present disclosure provides the accompanying drawings and the following description in order to allow those skilled in the art to fully understand the present disclosure, and do not intend to limit the subject matter as described in the appended claims.

First Exemplary Embodiment

Electronic apparatus 100 according to a first exemplary embodiment of the present disclosure is described with reference to FIG. 1 to FIG. 19.
[1-1. Configuration]
[1-1-1. Overall Configuration]

Figure 1:
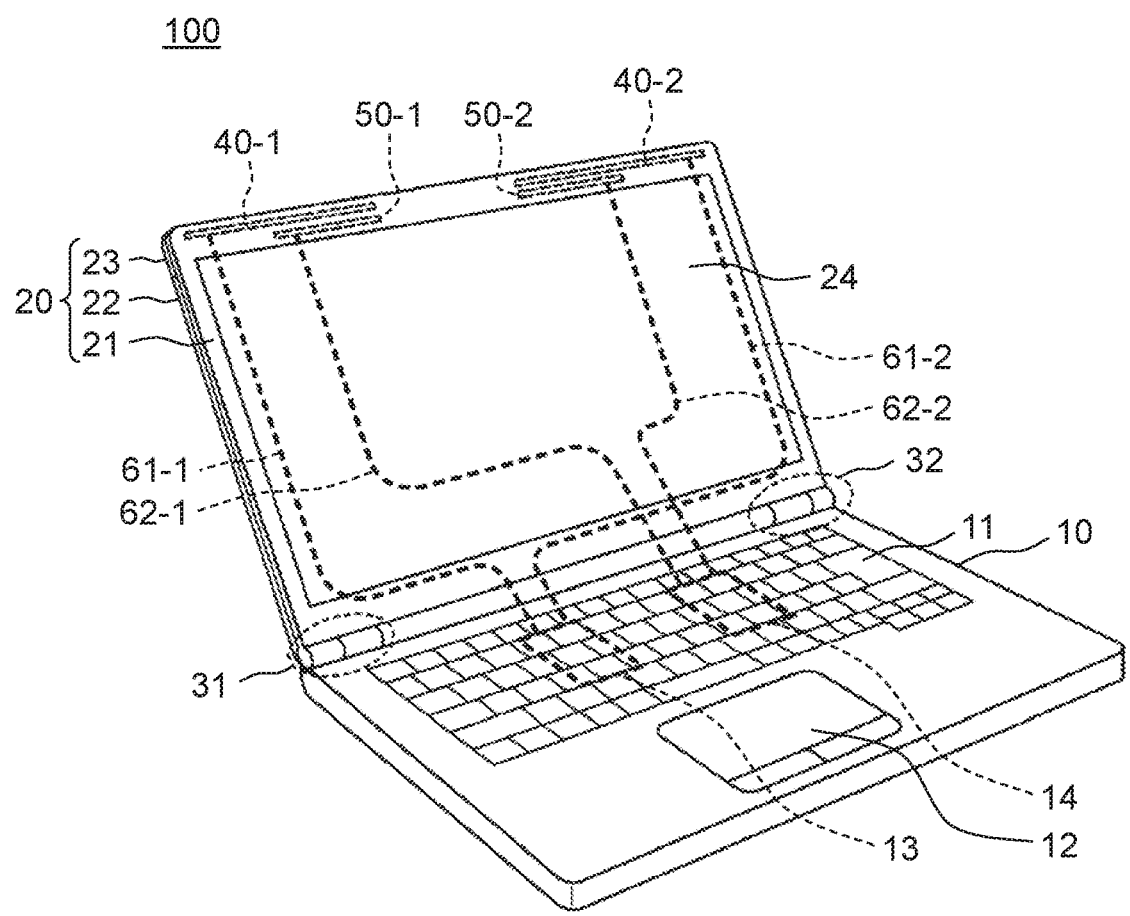
FIG. 1 is a perspective view showing an electronic apparatus according to a first exemplary embodiment of the present disclosure.
Figure 2:
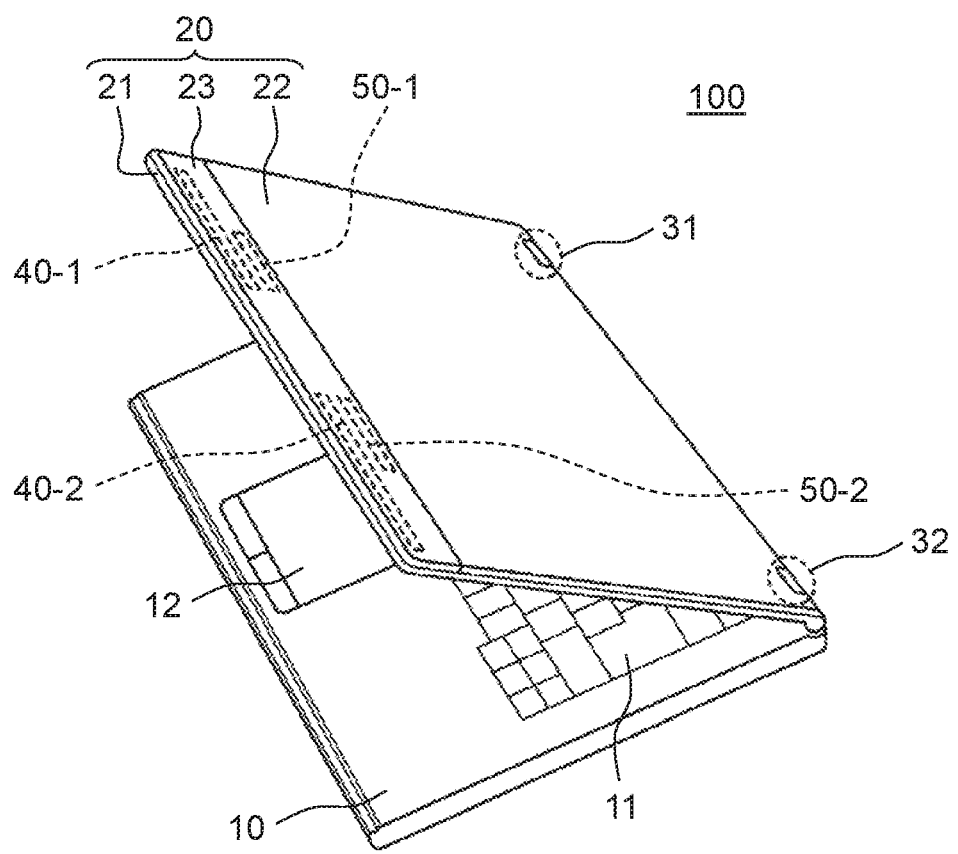
FIG. 2 is a perspective view showing an outer side of an upper casing of the electronic apparatus according to the first exemplary embodiment of the present disclosure.

FIG. 1 is a perspective view showing electronic apparatus 100 according to the first exemplary embodiment of the present disclosure in an open state. Electronic apparatus 100 is a notebook computer, for example. A casing of electronic apparatus 100 includes lower casing 10 and upper casing 20 which are openably connected with each other by means of hinges 31, 32. Each of lower casing 10 and upper casing 20 has a substantially rectangular parallelepiped shape. FIG. 2 is a perspective view showing an outer side of upper casing 20 of electronic apparatus 100 shown in FIG. 1.

Electronic apparatus 100 includes keyboard 11 and pointing device 12 on a front surface of lower casing 10. In electronic apparatus 100, wireless communication circuit 13 for a wide area network (WAN) (for example, LTE or the like) which is operated in a low frequency band, and wireless communication circuit 14 for a local area network (LAN) (for example, Wi-Fi or the like) which is operated in a high frequency band higher than the low frequency band are disposed in lower casing 10. The low frequency band includes 700 MHz to 950 MHz and 1.4 GHz to 2.17 GHz, for example. The high frequency band includes 2.4 GHz to 2.5 GHz and 5.15 GHz to 5.825 GHz, for example.

In electronic apparatus 100, display 24 which is formed of a liquid crystal display device and antenna boards 40-1, 40-2, 50-1, 50-2 are disposed in upper casing 20. Each of antenna boards 40-1, 40-2 is a WAN antenna having a plate shape and extending with a predetermined length, and is operated in the low frequency band (for example, 700 MHz to 950 MHz and 1.4 GHz to 2.17 GHz). Antenna boards 40-1, 40-2 are respectively connected to WAN wireless communication circuit 13 through feed lines 61-1 and 61-2. Each of antenna boards 50-1, 50-2 is a LAN antenna having a plate shape and extending with a predetermined length which is shorter than the length of antenna boards 40-1, 40-2, and is operated in the high frequency band (for example, 2.4 GHz to 2.5 GHz and 5.15 GHz to 5.825 GHz). Antenna boards 50-1, 50-2 are respectively connected to LAN wireless communication circuit 14 through feed lines 62-1 and 62-2.

Antenna boards 40-1, 40-2, 50-1, 50-2 are formed in a region of upper casing 20 around display 24. In the example shown in FIG. 1 and FIG. 2, antenna boards 40-1, 40-2, 50-1, 50-2 can be arranged in the region of upper casing 20 over an entire width which is disposed on an upper side of display 24 (a portion on a side opposite to hinges 31 and 32 with respect to display 24). In this region, WAN antenna boards 40-1, 40-2 are disposed at positions different from each other, and LAN antenna boards 50-1, 50-2 are disposed at positions different from each other. WAN wireless communication circuit 13 performs communication by selectively using either one of antenna board 40-1 or antenna board 40-2 thus realizing spatial diversity. In the same manner, LAN wireless communication circuit 14 performs communication by selectively using either one of antenna board 50-1 or antenna board 50-2 thus realizing spatial diversity.

Upper casing 20 includes: bezel 21 forming an inner casing which is not exposed to the outside when electronic apparatus 100 is folded; and panel 22 and antenna cover 23 forming an outer casing which is exposed to the outside when electronic apparatus 100 is folded. Bezel 21 and antenna cover 23 are made of a non-metal material such as a synthetic resin. Panel 22 is made of a conductive material such as a magnesium alloy. Bezel 21 is disposed so as to surround a peripheral edge portion of a screen of display 24. Panel 22 has a substantially rectangular shape as viewed in a plan view. Panel 22 is a back surface panel disposed on the rear side of display 24. Panel 22 has a portion for supporting antenna boards 40-1, 40-2, 50-1, 50-2 such that panel 22 accommodates antenna boards 40-1, 40-2, 50-1, 50-2 without preventing transmission and reception of a radio wave performed by antenna boards 40-1, 40-2, 50-1, 50-2. In the example shown in FIG. 1 and FIG. 2, the antenna support portion is formed on panel 22 having a substantially rectangular shape as viewed in a plan view in an elongated region along an opposite side of a side connected to hinges 31 and 32. Antenna cover 23 is disposed so as to cover the antenna support portion of panel 22 and antenna boards 40-1, 40-2, 50-1, 50-2 formed on the antenna support portion of panel 22.

In Electronic apparatus 100, a central processing unit (CPU), a battery, a hard disk drive (HDD) or a solid state drive (SSD), various input/output terminals, and other parts are further disposed in lower casing 10. In electronic apparatus 100, parts such as an optical disk drive for reading/writing data from/in a Blu-ray disc and/or a DVD disc, a microphone and a speaker may be further disposed in lower casing 10. In electronic apparatus 100, a part such as a web camera may be further disposed in upper casing 20. A function and a shape of these parts are substantially equal to those of a conventional notebook computer and hence, illustration and detailed description of these parts are omitted.

[1-1-2. Arrangement of Antenna Board]

Next, the arrangement of antenna boards 40-1, 40-2, 50-1, 50-2 is described with reference to FIG. 3 to FIG. 7.

Figure 3:
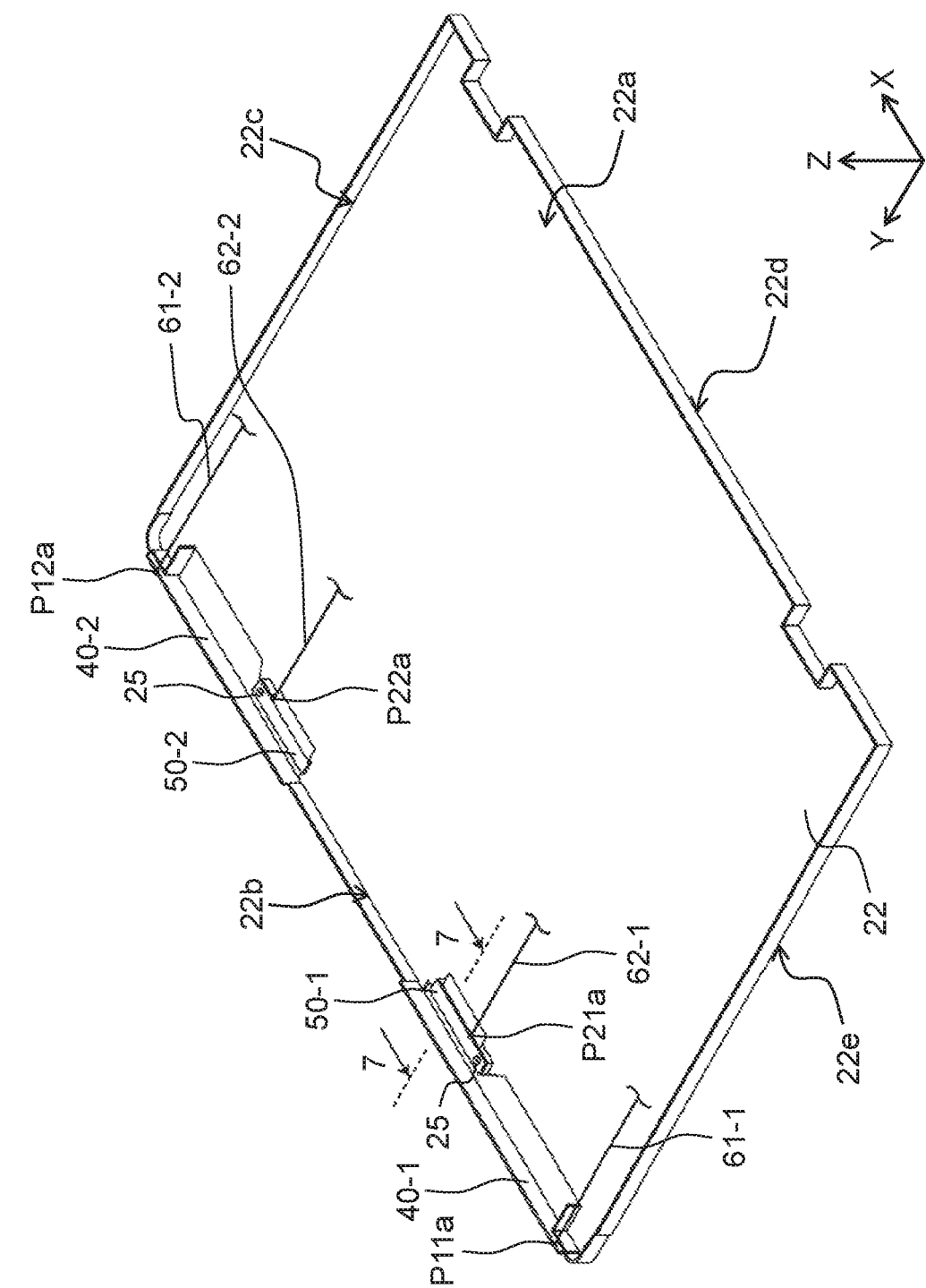
FIG. 3 is a perspective view showing an inner surface of a panel of the upper casing of the electronic apparatus according to the first exemplary embodiment of the present disclosure.
Figure 4:
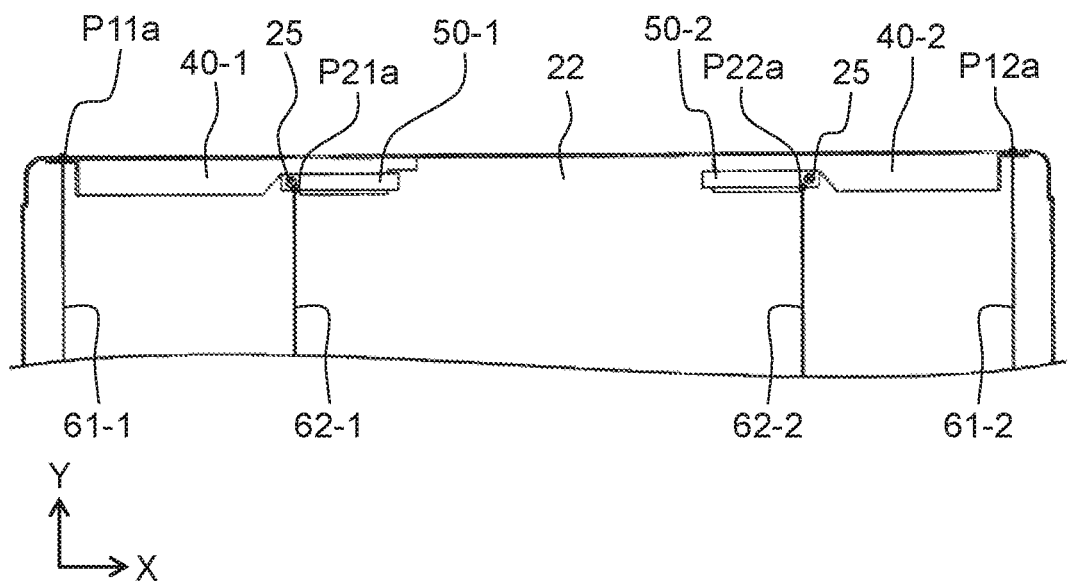
FIG. 4 is a plan view showing a portion of the inner surface of the panel of the upper casing of the electronic apparatus according to the first exemplary embodiment of the present disclosure.
Figure 5:
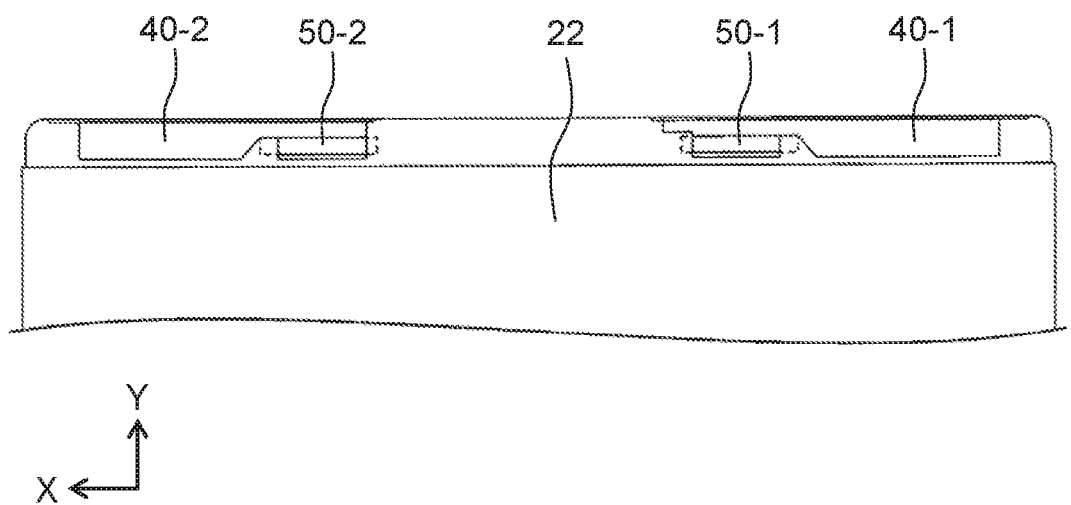
FIG. 5 is a plan view showing a portion of an outer surface of the panel of the upper casing of the electronic apparatus according to the first exemplary embodiment of the present disclosure.
Figure 6:
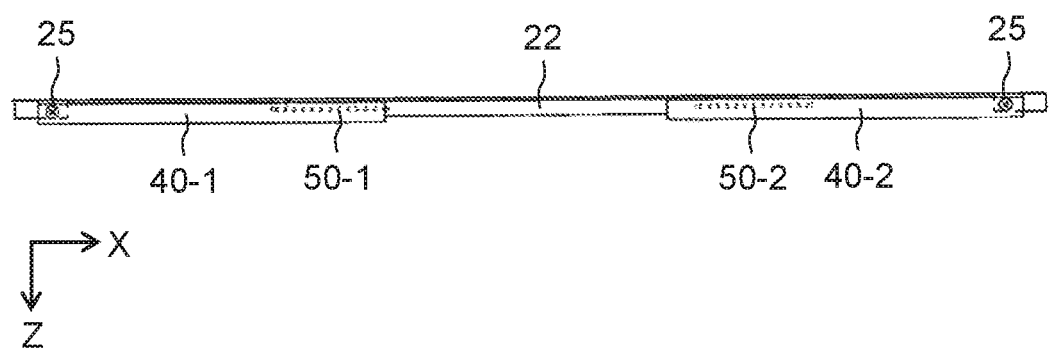
FIG. 6 is a side view showing an upper side surface of the panel of the upper casing of the electronic apparatus according to the first exemplary embodiment of the present disclosure.
Figure 7:
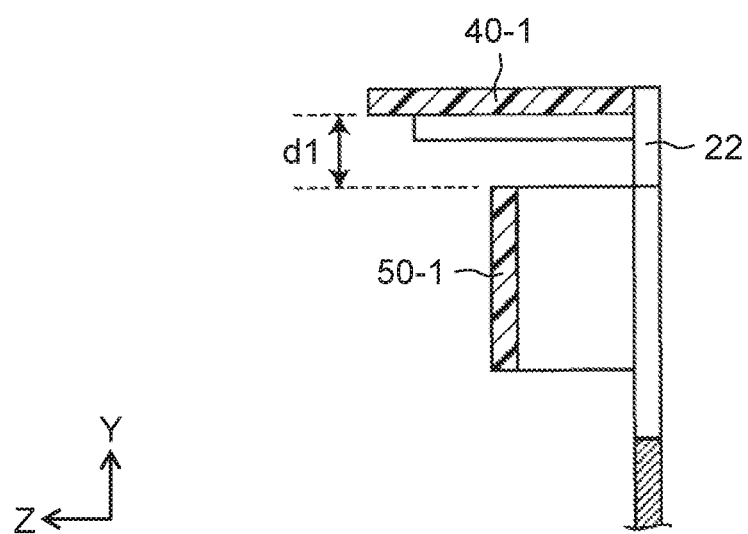
FIG. 7 is a cross-sectional view of the panel of the upper casing taken along line 7-7 in FIG. 3.

FIG. 3 is a perspective view showing an inner surface of panel 22 of upper casing 20 of electronic apparatus 100 shown in FIG. 1. FIG. 4 is a plan view showing a portion of the inner surface of panel 22 of upper casing 20 of electronic apparatus 100 shown in FIG. 1. FIG. 5 is a plan view showing a portion of an outer surface of panel 22 of upper casing 20 of electronic apparatus 100 shown in FIG. 1. FIG. 6 is a side view showing an upper side surface of panel 22 of upper casing 20 of electronic apparatus 100 shown in FIG. 1. FIG. 7 is a cross-sectional view of panel 22 of upper casing 20 taken along line 7-7 in FIG. 3. Hereinafter, with reference to XYZ coordinates shown in the drawing, +Y side, −Y side, −X side and +X side are assumed as an upper side, a lower side, a left side and a right side respectively.

Back surface 22a of panel 22 which is parallel to an XY plane forms one main surface of upper casing 20. As described above, panel 22 has a substantially rectangular shape as viewed in a plan view. Panel 22 has upper side 22b and lower side 22d which are parallel to an X axis and right side 22c and left side 22e which are parallel to a Y axis. Antenna boards 40-1, 40-2, 50-1, 50-2 are arranged such that longitudinal directions of antenna boards 40-1, 40-2, 50-1, 50-2 are parallel to upper side 22b of panel 22. In other words, antenna boards 40-1, 40-2, 50-1, 50-2 are arranged so as to be parallel to an extending direction of one side portion of upper casing 20.

Antenna board 40-1 and antenna board 50-1 are arranged parallel to each other. As shown in FIG. 6, antenna board 40-1 is fixed to panel 22 by screw 25. Antenna board 40-1 is arranged such that a pair of main surfaces of antenna board 40-1 is perpendicular to back surface 22a of panel 22. As shown in FIG. 3 and FIG. 4, antenna board 50-1 is fixed to panel 22 by screw 25. Antenna board 50-1 is arranged such that a pair of main surfaces of antenna board 50-1 is parallel to back surface 22a of panel 22.

Antenna board 40-2 and antenna board 50-2 are arranged parallel to each other. As shown in FIG. 6, antenna board 40-2 is fixed to panel 22 by screw 25. Antenna board 40-2 is arranged such that a pair of main surfaces of antenna board 40-2 is perpendicular to back surface 22a of panel 22. As shown in FIG. 3 and FIG. 4, antenna board 50-2 is fixed to panel 22 by screw 25. Antenna board 50-2 is arranged such that a pair of main surfaces of antenna board 50-2 is parallel to back surface 22a of panel 22.

As shown in FIG. 7, antenna board 40-1 and antenna board 50-1 are arranged with predetermined distance d1 therebetween in the Y direction. Assume a case where a length of antenna board 40-1 in the longitudinal direction is approximately 90 mm, for example, and a length of antenna board 50-1 in the longitudinal direction is approximately 30 mm, for example. In such a case, distance d1 is set to approximately 4 mm, for example.

As shown in FIG. 3, antenna board 40-1 includes feedpoint P11a, and feedpoint P11a is connected to WAN wireless communication circuit 13 through feed line 61-1. Antenna board 40-2 includes feedpoint P12a, and feedpoint P12a is connected to WAN wireless communication circuit 13 through feed line 61-2. Antenna board 50-1 includes feedpoint P21a, and feedpoint P21a is connected to LAN wireless communication circuit 14 through feed line 62-1. Antenna board 50-2 includes feedpoint P22a, and feedpoint P22a is connected to LAN wireless communication circuit 14 through feed line 62-2.

[1-1-3. Configurations and Manners of Operations of Antenna Boards]

Next, configurations and manners of operations of antenna boards 40-1, 40-2, 50-1, 50-2 are described with reference to FIG. 8 to FIG. 18. Each of antenna boards 40-1, 40-2 is formed as a multi band antenna which is operated at a plurality of frequencies in a low frequency band. Each of antenna boards 50-1, 50-2 is formed as a multi band antenna which is operated at a plurality of frequencies in a high frequency band.

First, the configuration and the manner of the operation of antenna board 40-1 are described with reference to FIG. 8 to FIG. 13.

Figure 8:
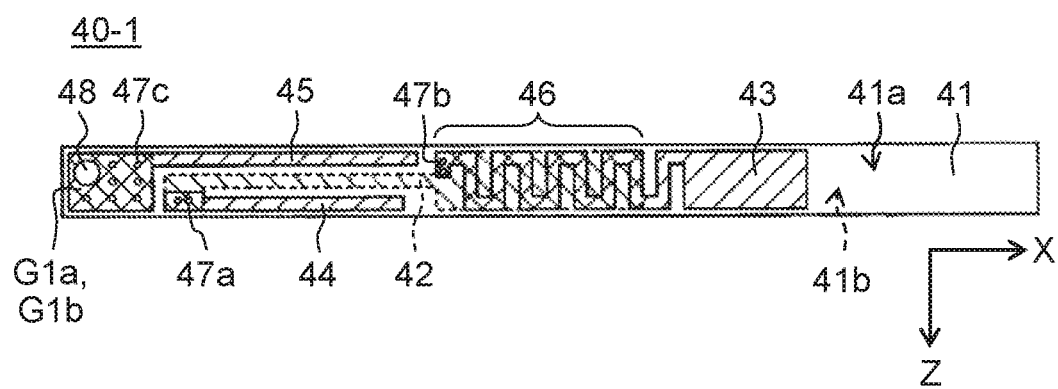
FIG. 8 is a plan view showing a configuration of a first antenna board of the electronic apparatus according to the first exemplary embodiment of the present disclosure.
Figure 9:
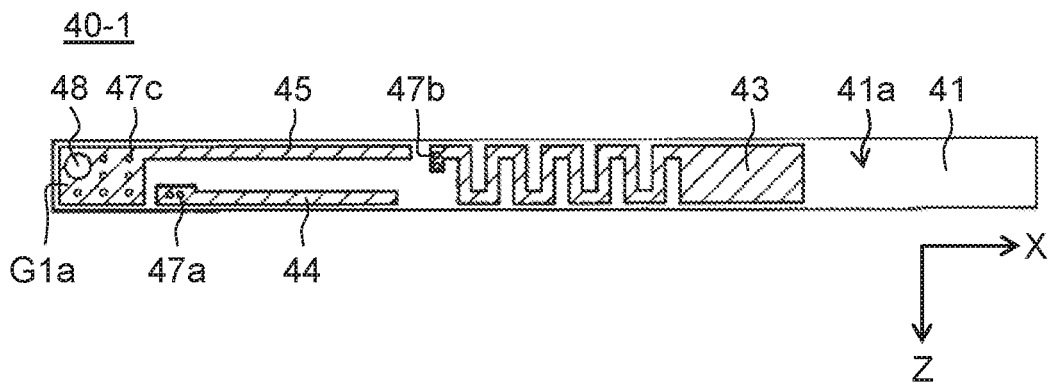
FIG. 9 is a plan view showing a pattern of radiation conductors on a front surface of the first antenna board shown in FIG. 8.
Figure 10:
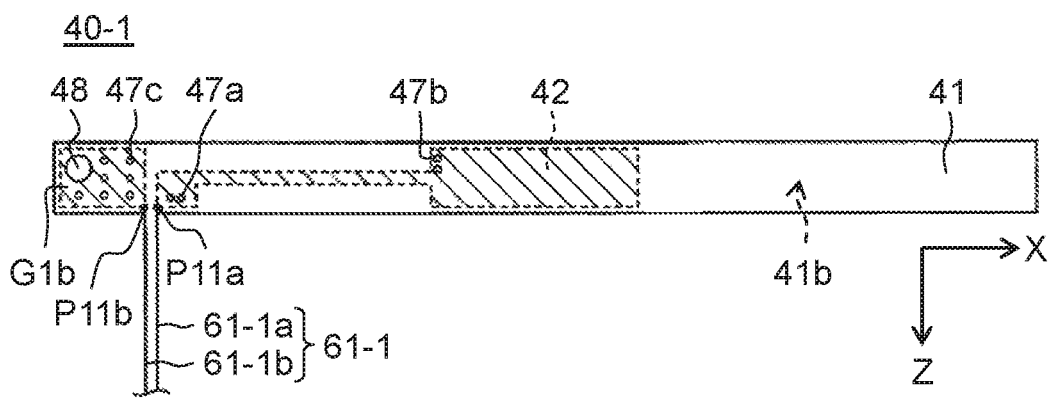
FIG. 10 is a plan view showing a pattern of the radiation conductors on a rear surface of the first antenna board shown in FIG. 8.

FIG. 8 is a plan view showing the configuration of first antenna board 40-1 of electronic apparatus 100 shown in FIG. 1. FIG. 9 is a plan view showing a pattern of radiation conductors on a front surface of first antenna board 40-1 shown in FIG. 8. FIG. 10 is a plan view showing a pattern of the radiation conductors on a rear surface of first antenna board 40-1 shown in FIG. 8.

Antenna board 40-1 includes: dielectric substrate 41; feedpoint P11a and connection point P11b; radiating elements 42 to 44 formed on a pair of main surfaces (front surface 41a and rear surface 41b) of dielectric substrate 41; parasitic element 45; and ground conductors G1a, G1b. Dielectric substrate 41 has a predetermined width and a predetermined length. Dielectric substrate 41 also has a first end portion (hereinafter referred to as "left end" since the first end portion is disposed on the left side in the drawing) and second end portion (hereinafter referred to as "right end" since the second end portion is disposed on the right side in the drawing) in the longitudinal direction, and a first surface (front surface 41a) and a second surface (rear surface 41b). Radiating elements 43, 44, parasitic element 45 and ground conductor G1a are formed on front surface 41a of dielectric substrate 41. Radiating element 42 and ground conductor G1b are formed on rear surface 41b of dielectric substrate 41. In FIG. 8 and FIG. 10, radiating element 42 and ground conductor G1b formed on rear surface 41b of dielectric substrate 41 are indicated by dotted lines. Each of radiating elements 42 to 44 is formed along the longitudinal direction of antenna board 40-1 with a predetermined length shorter than a length of antenna board 40-1 in the longitudinal direction. Radiating elements 42 to 44, parasitic element 45 and ground conductors G1a, G1b are formed on both surfaces of a printed circuit board as a conductive pattern, for example.

Ground conductors G1a, G1b are disposed at predetermined positions on dielectric substrate 41. For example, ground conductors G1a, G1b are disposed at positions close to the left end of dielectric substrate 41. Antenna board 40-1 also has at least one through hole conductor 47c which penetrates dielectric substrate 41, and electrically connects ground conductors G1a, G1b with each other.

Radiating element 42 is formed on rear surface 41b of dielectric substrate 41 so as to extend with a predetermined length from a position away from ground conductor G1b by a predetermined distance (a position on the right side of ground conductor G1b in FIG. 8 and FIG. 10) toward the right end of dielectric substrate 41. Feedpoint P11a is formed on radiating element 42 at a position where radiating element 42 and ground conductor G1b are disposed close to each other. Connection point P11b is formed on ground conductor G1b at a position where radiating element 42 and ground conductor G1b are disposed close to each other. Accordingly, feedpoint P11a and connection point P11b are disposed close to each other. Accordingly, radiating element 42 extends from feedpoint P11a toward the right end of dielectric substrate 41. Radiating element 42 has: a first end portion (hereinafter referred to as "left end" since the first end portion is disposed on the left side in the drawing) which is disposed close to feedpoint P11a; and a second end portion (hereinafter referred to as "right end" since the second end portion is disposed on the right side in the drawing) which is disposed remote from feedpoint P11a.

Radiating element 43 is formed on front surface 41a of dielectric substrate 41 so as to extend with a predetermined length along the longitudinal direction of dielectric substrate 41. Radiating element 43 has: a first end portion (hereinafter referred to as "left end" since the first end portion is disposed on the left side in the drawing); and a second end portion (hereinafter referred to as "right end" since the second end portion is disposed on the right side in the drawing). The second end portion is remoter from feedpoint P11a than the first end portion is. Accordingly, the first end portion is disposed relatively close to feedpoint P11a, and the second end portion is disposed relatively remote from feedpoint P11a. Radiating element 43 has a portion thereof which overlaps with radiating element 42 with dielectric substrate 41 interposed between radiating element 43 and radiating element 42, and a portion thereof extending from a position where radiating element 43 overlaps with the right end of radiating element 42 toward the right end of dielectric substrate 41. At any position in a portion of antenna board 40-1 where radiating elements 42, 43 overlap with each other with dielectric substrate 41 interposed therebetween, antenna board 40-1 has at least one through hole conductor 47b which penetrates dielectric substrate 41 and electrically connects radiating elements 42, 43 with each other. In the example shown in FIG. 8 to FIG. 10, through hole conductors 47b are formed at the left end of radiating element 43.

Radiating element 44 is formed on front surface 41a of dielectric substrate 41 so as to extend with a predetermined length from a position away from ground conductor G1a by a predetermined distance (a position on the right side of ground conductor G1a in FIG. 8 and FIG. 9) toward the right end of dielectric substrate 41. Radiating element 44 has a first end portion (hereinafter referred to as "left end" since the first end portion is disposed on the left side in the drawing) and a second end portion (hereinafter referred to as "right end" since the second end portion is disposed on the right side in the drawing). At the left end of radiating element 44 and the left end of radiating element 42, antenna board 40-1 has at least one through hole conductor 47a which penetrates dielectric substrate 41, and electrically connects radiating elements 42, 44 with each other. Accordingly, radiating element 44 is electrically connected with feedpoint P11a, and radiating element 44 extends from feedpoint P11a toward the right end of dielectric substrate 41. A length of radiating element 44 in the longitudinal direction is shorter than a length of radiating element 42 in the longitudinal direction. To prevent a phenomenon where strong electromagnetic coupling occurs between radiating element 44 and radiating elements 42, 43 so that the resonance of radiating element 44 is prevented, at least a portion of radiating element 44 is disposed remote from radiating elements 42, 43. Accordingly, for example, on both surfaces of dielectric substrate 41, radiating element 44 and radiating element 42 are arranged such that at least a portion of radiating element 44 does not overlap with radiating element 42 with dielectric substrate 41 interposed between radiating element 44 and radiating element 42. Further, on front surface 41a of dielectric substrate 41, radiating element 44 is arranged away from radiating element 43 by a predetermined distance.

Parasitic element 45 and ground conductor G1a are formed as an integral body. Parasitic element 45 is formed on front surface 41a of dielectric substrate 41 so as to extend with a predetermined length from ground conductor G1a toward the right end of dielectric substrate 41. Parasitic element 45 is disposed so as to allow the occurrence of predetermined electromagnetic coupling between parasitic element 45 and radiating elements 42, 44.

Feedpoint P11a and connection point P11b are connected to WAN wireless communication circuit 13 through feed line 61-1. Feed line 61-1 is a shield line having inner conductor 61-1a and outer conductor 61-1b. Inner conductor 61-1a is connected to feedpoint P11a, and outer conductor 61-1b is connected to connection point P11b.

Antenna board 40-1 has screw hole 48 at a position where ground conductors G1a, G1b are located so as to fix antenna board 40-1 to panel 22 by screw 25. When antenna board 40-1 is fixed to panel 22 by screw 25, ground conductors G1a, G1b are electrically connected to panel 22. However, antenna board 40-1 is formed such that when antenna board 40-1 is fixed to panel 22 by screw 25, conductive portions (radiating elements 42 to 44 and parasitic element 45) other than ground conductors G1a, G1b are not electrically brought into contact with the panel.

Radiating element 42 is capacitively coupled with radiating element 43 at a portion where radiating elements 42, 43 overlap with each other with dielectric substrate 41 interposed therebetween. With the adjustment of a position of the right end of radiating element 42, a capacity between radiating elements 42, 43 can be adjusted. At least one of radiating elements 42, 43 has a portion having a meandering shape formed with a predetermined length at a portion where radiating elements 42, 43 are capacitively coupled with each other. In the example shown in FIG. 8 to FIG. 10, radiating element 43 has a portion having a meandering shape which is formed with a predetermined length from the left end of radiating element 43 toward the right end of radiating element 43. The portion having a meandering shape has a predetermined inductance. With the adjustment of a length of the portion having a meandering shape, an inductance of the portion having a meandering shape can be adjusted. LC resonator 46 is formed by the portion of radiating element 43 having a meandering shape and a portion where radiating elements 42, 43 are capacitively coupled with each other. A resonance frequency of LC resonator 46 is determined depending on an inductance of the meandering portion and an area of a portion of radiating element 42 which overlaps with the meandering portion. Accordingly, a resonance frequency of LC resonator 46 can be determined to a desired frequency by only adjusting a position of the right end of radiating element 42. That is, the resonance frequency of LC resonator 46 can be adjusted independently from an entire length of radiating element 43 and an entire length of radiating element 44.

In order to minimize electromagnetic coupling between radiating elements 42 to 44 (excluding a portion of LC resonator 46), radiating elements 42 to 44 are formed so as to be disposed remote from each other in the width direction of dielectric substrate 41.

As described hereinafter, antenna board 40-1 is operated at three frequencies (that is, first low frequency f1$a$, second low frequency f1$b$, and third low frequency f1$c$) in a low frequency band.

Figure 11:
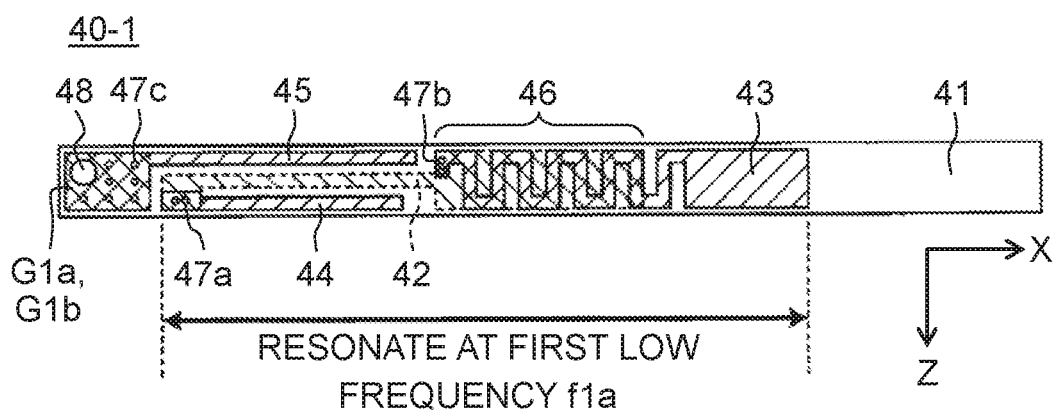
FIG. 11 is a view showing a portion of the first antenna board of the electronic apparatus according to the first exemplary embodiment of the present disclosure which resonates when the first antenna board is operated at first low frequency f1$a$.

FIG. 11 is a view showing a portion of first antenna board 40-1 of electronic apparatus 100 shown in FIG. 1 which resonates when first antenna board 40-1 is operated at first low frequency f1$a$. When antenna board 40-1 is operated at first low frequency f1$a$, a portion of first antenna board 40-1 ranging from feedpoint P11$a$ of radiating element 42, 43 to the right end of radiating element 43 resonates. Radiating element 43 includes the portion having a meandering shape and hence, an electrical length of radiating element 43 is increased.

Figure 12:
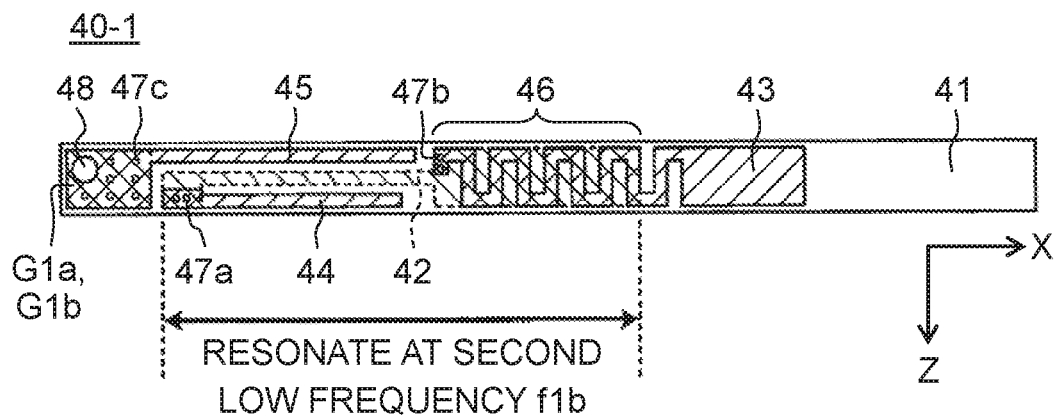
FIG. 12 is a view showing a portion of the first antenna board of the electronic apparatus according to the first exemplary embodiment of the present disclosure which resonates when the first antenna board is operated at second low frequency f1$b$.

FIG. 12 is a view showing a portion of first antenna board 40-1 of electronic apparatus 100 shown in FIG. 1 which resonates when first antenna board 40-1 is operated at second low frequency f1$b$. When antenna board 40-1 is operated at second low frequency f1$b$ higher than first low frequency f1$a$, a portion of antenna board 40-1 ranging from feedpoint P11$a$ of radiating element 42 to LC resonator 46 resonates. Antenna board 40-1 includes LC resonator 46 and hence, radiating element 42 resonates at second low frequency f1$b$.

Figure 13:
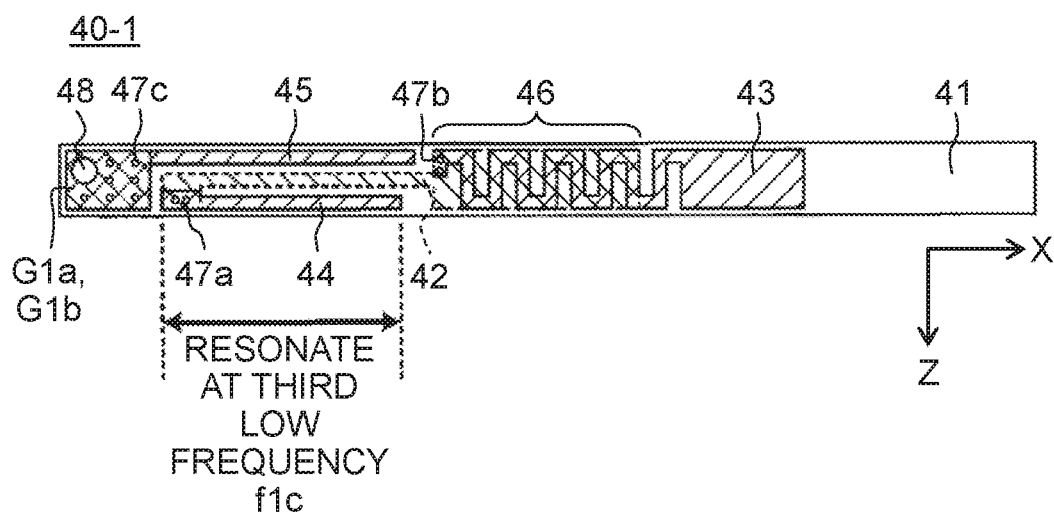
FIG. 13 is a view showing a portion of the first antenna board of the electronic apparatus according to the first exemplary embodiment of the present disclosure which resonates when the first antenna board is operated at third low frequency f1$c$.

FIG. 13 is a view showing a portion of first antenna board 40-1 of electronic apparatus 100 shown in FIG. 1 which resonates when first antenna board 40-1 is operated at third low frequency f1$c$. When antenna board 40-1 is operated at third low frequency f1$c$ higher than second low frequency f1$b$, radiating element 44 resonates.

When the low frequency band includes 700 MHz to 950 MHz and 1.4 GHz to 2.17 GHz, for example, first low frequency f1$a$ is a frequency in a band of 700 MHz, second low frequency f1$b$ is a frequency in a band of 1.5 GHz, and third low frequency f1$c$ is a frequency in a band of 2.1 GHz.

Antenna board 40-2 is also formed in the same manner as antenna board 40-1.

Next, the configuration and the manner of the operation of antenna board 50-1 are described with reference to FIG. 14 to FIG. 18.

Figure 14:
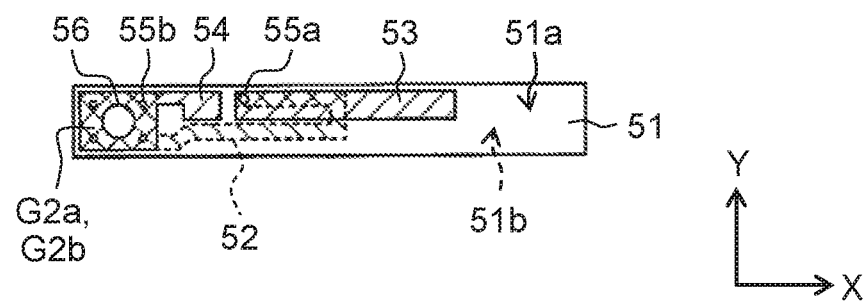
FIG. 14 is a plan view showing a configuration of a second antenna board of the electronic apparatus according to the first exemplary embodiment of the present disclosure.
Figure 15:
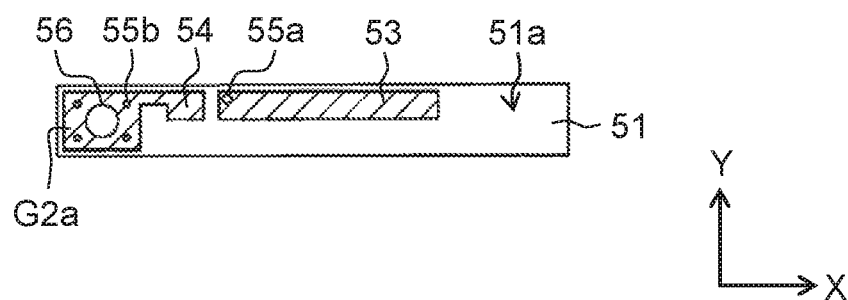
FIG. 15 is a plan view showing a pattern of radiation conductors on a front surface of the second antenna board shown in FIG. 14.
Figure 16:
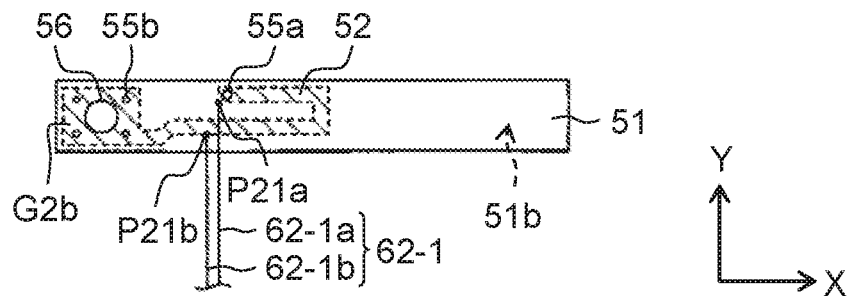
FIG. 16 is a plan view showing a pattern of the radiation conductors on a rear surface of the second antenna board shown in FIG. 14.

FIG. 14 is a plan view showing the configuration of second antenna board 50-1 of electronic apparatus 100 shown in FIG. 1. FIG. 15 is a plan view showing a pattern of radiation conductors on a front surface of second antenna board 50-1 shown in FIG. 14. FIG. 16 is a plan view showing a pattern of the radiation conductors on a rear surface of second antenna board 50-1 shown in FIG. 14.

Antenna board 50-1 includes: dielectric substrate 51; feedpoint P21$a$ and connection point P21$b$; radiating elements 52, 53 formed on a pair of main surfaces (front surface 51$a$ and rear surface 51$b$) of dielectric substrate 51; parasitic element 54; and ground conductors G2$a$, G2$b$. Dielectric substrate 51 has a predetermined width and a predetermined length. Dielectric substrate 51 also has a first end portion (hereinafter referred to as "left end" since the first end portion is disposed on the left side in the drawing) and a second end portion (hereinafter referred to as "right end" since the second end portion is disposed on the right side in the drawing) along the longitudinal direction, and a first surface (front surface 51$a$) and a second surface (rear surface 51$b$). Radiating element 53, parasitic element 54, and ground conductor G2$a$ are formed on front surface 51$a$ of dielectric substrate 51. Radiating element 52 and ground conductor G2$b$ are formed on rear surface 51$b$ of dielectric substrate 51. In FIG. 14 and FIG. 16, radiating element 52 and ground conductor G2$b$ formed on rear surface 51$b$ of dielectric substrate 51 are indicated by dotted lines. Each of radiating elements 52, 53 is formed along the longitudinal direction of antenna board 50-1 with a predetermined length shorter than a length of antenna board 50-1 in the longitudinal direction. Radiating elements 52, 53, parasitic element 54 and ground conductors G2$a$, G2$b$ are formed on both surfaces of a printed circuit board as a conductive pattern, for example.

Ground conductors G2$a$, G2$b$ are disposed at predetermined positions on dielectric substrate 51. For example, ground conductors G2$a$, G2$b$ are disposed at positions close to the left end of dielectric substrate 51. Antenna board 50-1 also has at least one through hole conductor 55$b$ which penetrates dielectric substrate 51, and electrically connects ground conductors G2$a$, G2$b$ with each other.

Radiating element 52 is routed in a loop shape on rear surface 51$b$ of dielectric substrate 51 between feedpoint P21$a$ and connection point P21$b$ disposed close to each other. Radiating element 52 further extends from a position where radiating element 52 is connected to connection point P21$b$ to ground conductor G2$b$, and is connected to ground conductor G2$b$.

Radiating element 53 is formed on front surface 51$a$ of dielectric substrate 51 so as to extend with a predetermined length from a position away from ground conductor G2$a$ by a predetermined distance (a position on the right side of ground conductor G2$a$ in FIG. 14 and FIG. 15) toward the right end of dielectric substrate 51. At one end of radiating element 52 close to a left end of radiating element 53 and feedpoint P21$a$, antenna board 50-1 has at least one through hole conductor 55$a$ which penetrates dielectric substrate 51, and electrically connects radiating elements 52, 53 with each other. Accordingly, radiating element 53 is electrically connected to feedpoint P21$a$, and radiating element 53 extends from feedpoint P21$a$ toward the right end of dielectric substrate 51.

Parasitic element 54 and ground conductor G2$a$ are formed as an integral body. Parasitic element 54 is formed on front surface 51$a$ of dielectric substrate 51 so as to extend with a predetermined length from ground conductor G2$a$ toward the right end of dielectric substrate 51. Parasitic element 54 is disposed so as to allow the occurrence of predetermined electromagnetic coupling with radiating elements 52, 53.

Feedpoint P21$a$ and connection point P21$b$ are connected to LAN wireless communication circuit 14 through feed line 62-1. Feed line 62-1 is a shield line having inner conductor 62-1$a$ and outer conductor 62-1$b$. Inner conductor 62-1$a$ is connected to feedpoint P21$a$, and outer conductor 62-1$b$ is connected to connection point P21$b$.

Antenna board 50-1 has screw hole 56 at a position where ground conductors G2*a*, G2*b* are located so as to fix antenna board 50-1 to panel 22 by screw 25. When antenna board 50-1 is fixed to panel 22 by screw 25, ground conductors G2*a*, G2*b* are electrically connected to panel 22. However, antenna board 50-1 is formed such that when antenna board 50-1 is fixed to panel 22 by screw 25, conductive portions (radiating elements 52, 53 and parasitic element 54) other than ground conductors G2*a*, G2*b* are not electrically brought into contact with the panel.

As described hereinafter, antenna board 50-1 is operated at two frequencies (that is, first high frequency f2*a*, second high frequency f2*b*) in a high frequency band.

Figure 17:
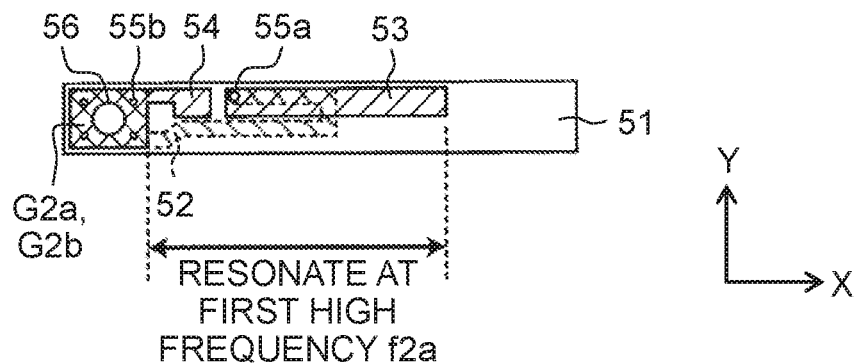
FIG. 17 is a view showing a portion of the second antenna board of the electronic apparatus according to the first exemplary embodiment of the present disclosure which resonates when the second antenna board is operated at first high frequency f2$a$.

FIG. 17 is a view showing a portion of second antenna board 50-1 of electronic apparatus 100 shown in FIG. 1 which resonates when second antenna board 50-1 is operated at first high frequency f2*a*. When antenna board 50-1 is operated at first high frequency f2*a*, both radiating element 52 and radiating element 53 which are connected with each other by way of through hole conductor 55*a* resonate, and each of radiating element 52 and radiating element 53 is operated as an inverted F antenna.

Figure 18:
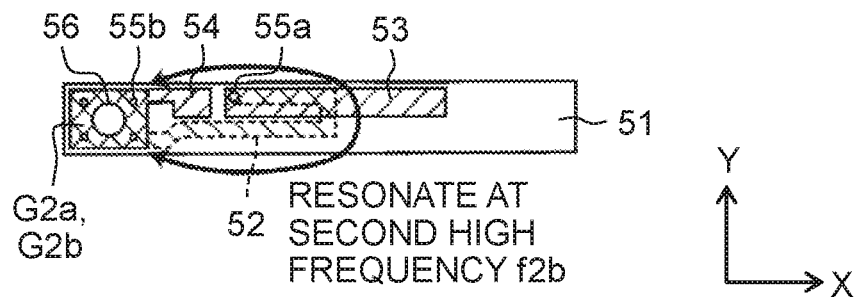
FIG. 18 is a view showing a portion of the second antenna board of the electronic apparatus according to the first exemplary embodiment of the present disclosure which resonates when the second antenna board is operated at second high frequency f2$b$.

FIG. 18 is a view showing a portion of second antenna board 50-1 of electronic apparatus 100 shown in FIG. 1 which resonates when second antenna board 50-1 is operated at second high frequency f2*b*. When antenna board 50-1 is operated at second high frequency f2*b*, radiating element 52 is electromagnetically coupled with parasitic element 54 so that a portion of radiating element 52 whose shape conforms to a loop shape and parasitic element 54 resonate whereby radiating element 52 is operated as a loop antenna.

When the high frequency band includes 2.4 GHz to 2.5 GHz and 5.15 GHz to 5.825 GHz, for example, first high frequency f2*a* is a frequency in a band of 2.4 GHz, and second high frequency f2*b* is a frequency in a band of 5 GHz.

Antenna board 50-2 is also formed in the same manner as antenna board 50-1.

[1-2. Manner of Operation]

In general, in incorporating an antenna in a casing of an electronic apparatus, to enable the antenna to transmit and receive a radio wave, it is necessary to form at least a portion of the casing using a non-metal material. On the other hand, to impart required strength to the casing of the electronic apparatus, it may be required that the most part of the casing be made of metal, and a portion of the casing which is made of a non-metal material be reduced as much as possible. In this case, a size of a portion of the casing where an antenna can be arranged (that is, a portion of the casing made of a non-metal material) is limited. For example, assume a case where an electronic apparatus is a notebook computer which includes a lower casing and an upper casing. In this case, a portion of the electronic apparatus where an antenna can be arranged may be limited to an elongated region on the upper casing having a substantially rectangular shape as viewed in a plan view which extends along one side of the upper casing.

Assume a case where a plurality of antennas are arranged in a casing of an electronic apparatus. In such a case, when a portion of the casing where the antennas can be arranged is limited to an elongated region of the casing, a restriction may be imposed on the plurality of antennas such that the antennas are arranged in series along the longitudinal direction of such a region. In this case, a restriction is imposed also on the size of the respective antennas.

Assume a case where a restriction is imposed on the size of the portion where the antennas can be arranged. In such a case, to arrange an antenna operated at a lower frequency (that is, antenna having a larger size) in the casing of the electronic apparatus, it is necessary to increase a size of the casing.

On the other hand, in the electronic apparatus according to the first exemplary embodiment, antenna boards 40-1, 40-2, 50-1, 50-2 are arranged as described above and hence, the following manner of the operation and advantageous effects can be acquired.

In electronic apparatus 100, antenna board 40-1 and antenna board 50-1 are arranged parallel to each other, and antenna board 40-2 and antenna board 50-2 are arranged parallel to each other. With such a configuration, compared to a case where antenna boards 40-1, 40-2, 50-1, 50-2 are arranged in series in a row without being arranged parallel to each other, a width (a length in the X direction) of upper casing 20 can be reduced so that upper casing 20 can be made compact.

Assume that upper casing 20 has a fixed size. In such a case, compared to a case where antenna boards 40-1, 40-2, 50-1, 50-2 are arranged in series in a row without being arranged parallel to each other, it is possible to increase a size of a region in which antenna boards 40-1, 40-2 operated in a low frequency band are arranged. Accordingly, operation frequencies of antenna boards 40-1, 40-2 can be lowered.

In electronic apparatus 100, antenna board 40-1 is arranged such that the pair of main surfaces of antenna board 40-1 is perpendicular to the pair of main surfaces of antenna board 50-1. With such a configuration, compared to a case where antenna board 40-1 and antenna board 50-1 are arranged such that a surface of antenna board 40-1 and a surface of antenna board 50-1 opposedly face each other, electromagnetic coupling between the conductive portion of antenna board 40-1 and the conductive portion of antenna board 50-1 can be reduced. In the same manner, in electronic apparatus 100, antenna board 40-2 is arranged such that the pair of main surfaces of antenna board 40-2 is perpendicular to the pair of main surfaces of antenna board 50-2. With such a configuration, compared to a case where antenna board 40-2 and antenna board 50-2 are arranged such that a surface of antenna board 40-2 and a surface of antenna board 50-2 opposedly face each other, electromagnetic coupling between the conductive portion of antenna board 40-2 and the conductive portion of antenna board 50-2 can be reduced. Electromagnetic coupling between antenna boards 40-1, 40-2, 50-1, 50-2 is reduced and hence, respective antenna boards 40-1, 40-2, 50-1, 50-2 can be favorably operated.

In this manner, according to electronic apparatus 100 of the first exemplary embodiment, it is possible to prevent the increase of a size of upper casing 20 even when the plurality of antenna boards 40-1, 40-2, 50-1, 50-2 are accommodated in upper casing 20.

Each of antenna boards 40-1, 40-2 operated in the low frequency band is formed as a multi band antenna and hence, the following manner of the operation and advantageous effects can be acquired.

Figure 19:
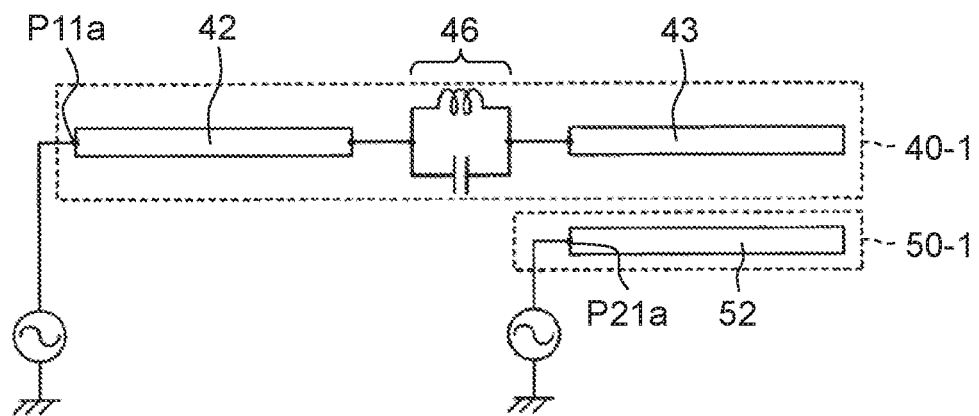
FIG. 19 is an equivalent circuit diagram of the first antenna board and the second antenna board of the electronic apparatus according to the first exemplary embodiment of the present disclosure.

FIG. 19 is an equivalent circuit diagram of antenna board 40-1 and antenna board 50-1 of electronic apparatus 100 shown in FIG. 1. As described above, in antenna board 40-1, LC resonator 46 is formed between radiating elements 42, 43. In other words, radiating elements 42, 43 of antenna board 40-1 include, along the longitudinal direction of antenna board 40-1, a zone ranging from feedpoint P11*a* to LC resonator 46 (a zone of radiating element 42) and a zone ranging from LC resonator 46 to a distal end of radiating element 43 (a zone of radiating element 43). Antenna board 40-1 is connected to feedpoint P11a in the zone of radiating element 42, and oppositely faces radiating element 52 (and radiating element 53) of antenna board 50-1 only in at least a portion of the zone of radiating element 43. When antenna board 40-1 is operated at first low frequency f1a, the whole radiating elements 42, 43 resonate. When antenna board 40-1 is operated at second low frequency f1b, the zone of radiating element 43 does not resonate, and the zone of radiating element 42 resonates.

The zone of radiating element 42 in antenna board 40-1 does not oppositely face radiating elements 52, 53 of antenna board 50-1. Accordingly, even when second low frequency f1b approaches first high frequency f2a or second high frequency f2b, and antenna board 40-1 and antenna board 50-1 are respectively operated at these frequencies, antenna board 40-1 and antenna board 50-1 minimally influence each other.

Further, as shown in FIG. 8, radiating element 44 of antenna board 40-1 does not oppositely face radiating elements 52, 53 of antenna board 50-1. Accordingly, even when third low frequency f1b approaches first high frequency f2a or second high frequency f2b, and antenna board 40-1 and antenna board 50-1 are respectively operated at these frequencies, antenna board 40-1 and antenna board 50-1 minimally influence each other.

Antenna board 40-2 and antenna board 50-2 are also operated in the same manner as antenna board 40-1 and antenna board 50-2.

In electronic apparatus 100, for example, antenna boards 40-1, 40-2 operated in the low frequency band can be used as a WAN antenna, and antenna boards 50-1, 50-2 operated in the high frequency band can be used as a LAN antenna. In small-sized upper casing 20 of electronic apparatus 100, antenna boards 40-1, 40-2, 50-1, 50-2 which are operated in two different operation frequency bands can be effectively used while preventing the lowering of performance of the antennas.

[1-3. Effects and Other Benefits]

In the first exemplary embodiment, electronic apparatus 100 includes: first antenna boards 40-1, 40-2 having a plate shape and extending with a first length; second antenna boards 50-1, 50-2 having a plate shape and extending with a second length; and rectangular parallelepiped upper casing 20. Rectangular parallelepiped upper casing 20 accommodates first antenna boards 40-1, 40-2 and second antenna boards 50-1, 50-2. First antenna boards 40-1, 40-2 and second antenna boards 50-1, 50-2 are arranged such that longitudinal directions of first antenna boards 40-1, 40-2 and longitudinal directions of second antenna boards 50-1, 50-2 are parallel to one side of one main surface of upper casing 20. First antenna board 40-1 and second antenna board 50-1 are arranged parallel to each other, and first antenna board 40-2 and second antenna board 50-2 are arranged parallel to each other.

With such a configuration, compared to a case where antenna boards 40-1, 40-2, 50-1, 50-2 are arranged in series in a row without being arranged parallel to each other, a width (a length in the X direction) of upper casing 20 can be reduced so that upper casing 20 can be made compact. Accordingly, it is possible to prevent the increase in a size of upper casing 20 even when the plurality of antenna boards 40-1, 40-2, 50-1, 50-2 are accommodated in upper casing 20.

Further, in the first exemplary embodiment, first antenna boards 40-1, 40-2 are arranged such that a pair of main surfaces of each of first antenna boards 40-1, 40-2 is perpendicular to one main surface of upper casing 20. Second antenna boards 50-1, 50-2 are arranged such that a pair of main surfaces of each of second antenna board 50-1, 50-2 is parallel to the one main surface of upper casing 20.

With such a configuration, electromagnetic coupling between the conductive portion of antenna board 40-1 and the conductive portion of antenna board 50-1 can be reduced, and electromagnetic coupling between the conductive portion of antenna board 40-2 and the conductive portion of antenna board 50-2 can be reduced.

In the first exemplary embodiment, first antenna boards 40-1, 40-2 are operated in the low frequency band (first frequency band), and second antenna boards 50-1, 50-2 are operated in the high frequency band (second frequency band) higher than the low frequency band. A length of each of second antenna boards 50-1, 50-2 in the longitudinal direction (second length) is shorter than a length of each of first antenna boards 40-1, 40-2 in the longitudinal direction (first length).

With such a configuration, for example, antenna boards 40-1, 40-2 operated in the low frequency band can be used as a WAN antenna, and antenna boards 50-1, 50-2 operated in the high frequency band can be used as a LAN antenna.

In the first exemplary embodiment, each of first antenna boards 40-1, 40-2 includes: first dielectric substrate 41; first feedpoints P11a, P12a; and at least one of first radiating elements 42 to 44. First feedpoints P11a, P12a are formed at predetermined positions on first dielectric substrate 41. Each of first radiating elements 42 to 44 is formed on at least one of the pair of main surfaces of first dielectric substrate 41. Each of first radiating elements 42 to 44 is formed along the longitudinal direction of first antenna boards 40-1, 40-2 with a length (third length) shorter than a length (first length) of first antenna boards 40-1, 40-2 in the longitudinal direction. Each of second antenna boards 50-1, 50-2 includes: second dielectric substrate 51; second feedpoints P21a, P22a; and at least one of second radiating elements 52, 53. Second feedpoints P21a, P22a are formed at predetermined positions on second dielectric substrate 51. Each of second radiating elements 52, 53 is formed on at least one of the pair of main surfaces of second dielectric substrate 51. Each of second radiating elements 52, 53 is formed along the longitudinal direction of second antenna boards 50-1, 50-2 with a length (fourth length) shorter than a length (second length) of second antenna board 50-1, 50-2 in the longitudinal direction. Each of first radiating elements 42 to 44 extends along the longitudinal direction of first antenna boards 40-1, 40-2, and includes the zone of radiating element 42 (first zone) and the zone of radiating element 43 (second zone). Each of first radiating elements 42 to 44 is connected to first feedpoints P11a, P12a in the zone of radiating element 42, and only at least a portion of the zone of radiating element 43 oppositely faces second radiating elements 52, 53.

With such a configuration, first antenna boards 40-1, 40-2 are operated as a multi band antenna. There may be a case where a resonance frequency of the zone of radiating element 42 of each of first antenna boards 40-1, 40-2 approaches a resonance frequency of each of second antenna boards 50-1, 50-2. In such a case, even when first antenna boards 40-1, 40-2 and second antenna boards 50-1, 50-2 are respectively operated at these frequencies, first antenna boards 40-1, 40-2 and second antenna boards 50-1, 50-2 minimally influence each other.

In the first exemplary embodiment, when each of first antenna boards 40-1, 40-2 is operated at first low frequency f1a within the low frequency band, whole radiating elements 42, 43 resonate. When each of first antenna boards 40-1, 40-2 is operated at second low frequency f1b higher than first low frequency f1a within the low frequency band, the zone of radiating element 42 of each of first antenna boards 40-1, 40-2 resonates.

There may be a case where second low frequency f1b approaches a resonance frequency of each of second antenna boards 50-1, 50-2. In such a case, even when first antenna boards 40-1, 40-2 and second antenna boards 50-1, 50-2 are respectively operated at these frequencies, first antenna boards 40-1, 40-2 and second antenna boards 50-1, 50-2 minimally influence each other.

In the first exemplary embodiment, each of first antenna boards 40-1, 40-2 includes LC resonator 46 between the zone of radiating element 42 and the zone of radiating element 43.

With such a configuration, with the adjustment of a resonance frequency of LC resonator 46, a resonance frequency of the zone of radiating element 42 and a resonance frequency of the zone of radiating element 43 can be properly adjusted.

Second Exemplary Embodiment

An electronic apparatus according to a second exemplary embodiment of the present disclosure is described with reference to FIG. 20 to FIG. 23.

[2-1. Configuration]

Figure 20:
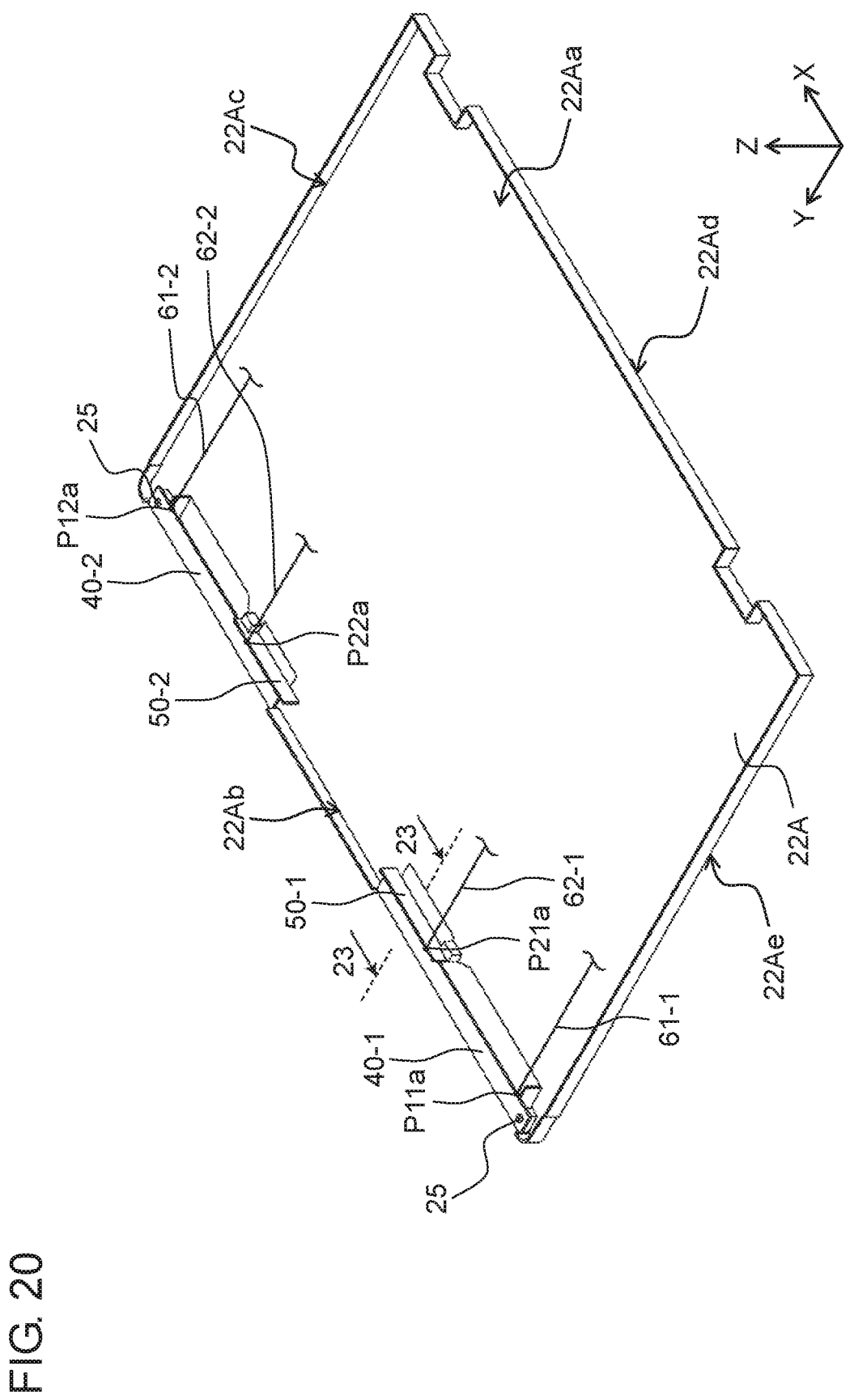
FIG. 20 is a perspective view showing an inner surface of a panel of an upper casing of an electronic apparatus according to a second exemplary embodiment of the present disclosure.
Figure 21:
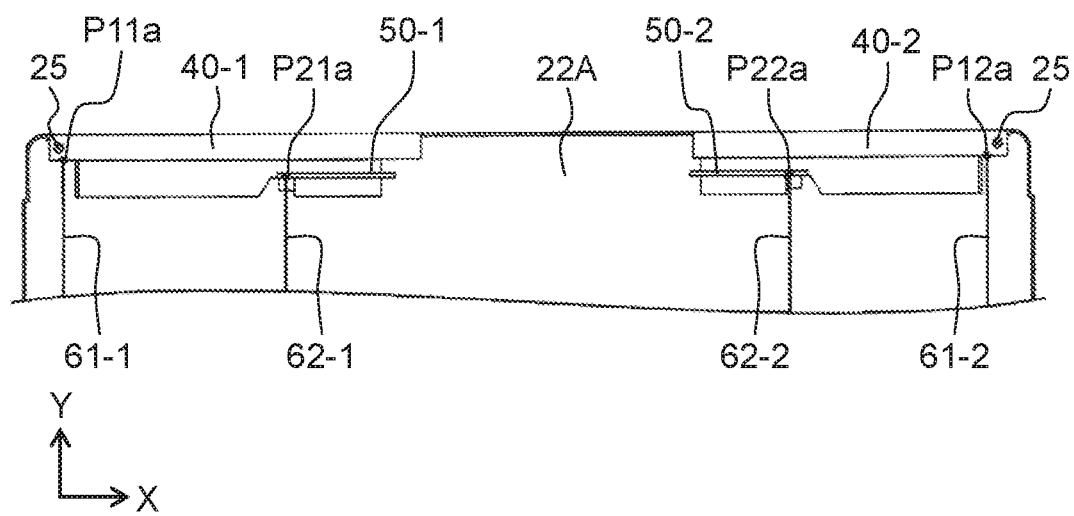
FIG. 21 is a plan view showing a portion of the inner surface of the panel of the upper casing of the electronic apparatus according to the second exemplary embodiment of the present disclosure.
Figure 22:
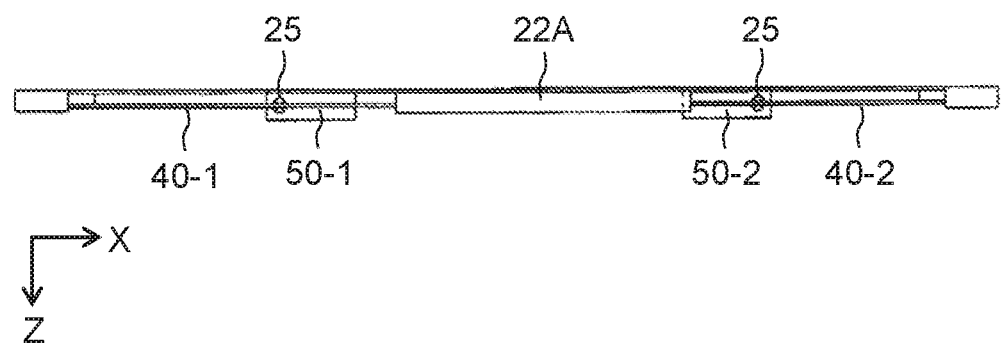
FIG. 22 is a side view showing an upper side surface of the panel of the upper casing of the electronic apparatus according to the second exemplary embodiment of the present disclosure.
Figure 23:
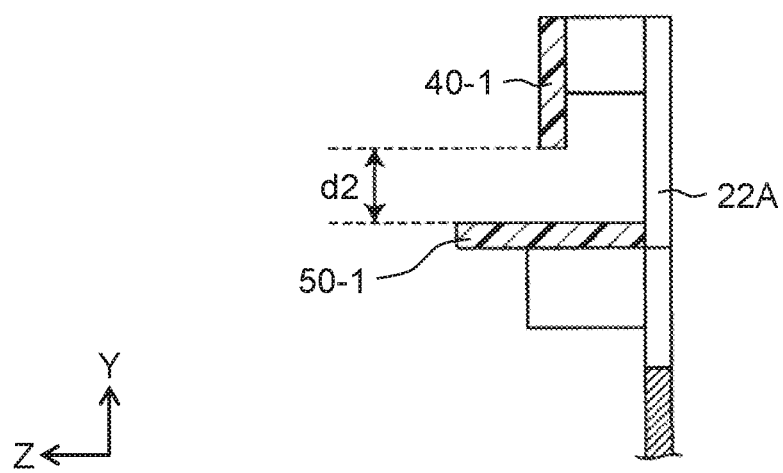
FIG. 23 is a cross-sectional view of the panel of the upper casing taken along line 23-23 in FIG. 20.

FIG. 20 is a perspective view showing an inner surface of panel 22A of an upper casing of the electronic apparatus according to the second exemplary embodiment of the present disclosure. FIG. 21 is a plan view showing a portion of the inner surface of panel 22A of the upper casing of the electronic apparatus according to the second exemplary embodiment of the present disclosure. FIG. 22 is a side view showing an upper side surface of panel 22A of the upper casing of the electronic apparatus according to the second exemplary embodiment of the present disclosure. FIG. 23 is a cross-sectional view of the panel of the upper casing taken along line 23-23 in FIG. 20. In the electronic apparatus according to the second exemplary embodiment, panel 22 of upper casing 20 of electronic apparatus 100 according to the first exemplary embodiment is replaced with panel 22A shown in FIG. 20 to FIG. 23.

Back surface 22Aa of panel 22A parallel to an XY plane forms one main surface of the upper casing. Panel 22A has a substantially rectangular shape as viewed in a plan view. Panel 22A has upper side 22Ab and lower side 22Ad which are parallel to an X axis, and right side 22Ac and left side 22Ae which are parallel to a Y axis. Antenna boards 40-1, 40-2, 50-1, 50-2 are arranged such that longitudinal directions of antenna boards 40-1, 40-2, 50-1, 50-2 are parallel to upper side 22Ab of panel 22A.

Antenna board 40-1 and antenna board 50-1 are arranged parallel to each other. As shown in FIG. 20 and FIG. 21, antenna board 40-1 is fixed to panel 22A by screw 25. Antenna board 40-1 is arranged such that a pair of main surfaces of antenna board 40-1 is parallel to back surface 22Aa of panel 22A. As shown in FIG. 22, antenna board 50-1 is fixed to panel 22A by screw 25. Antenna board 50-1 is arranged such that a pair of main surfaces of antenna board 50-1 is perpendicular to back surface 22Aa of panel 22A.

Antenna board 40-2 and antenna board 50-2 are arranged parallel to each other. As shown in FIG. 20 and FIG. 21, antenna board 40-2 is fixed to panel 22A by screw 25. Antenna board 40-2 is arranged such that a pair of main surfaces of antenna board 40-2 is parallel to back surface 22Aa of panel 22A. As shown in FIG. 22, antenna board 50-2 is fixed to panel 22A by screw 25. Antenna board 50-2 is arranged such that a pair of main surfaces of antenna board 50-2 is perpendicular to back surface 22Aa of panel 22A.

As shown in FIG. 23, antenna board 40-1 and antenna board 50-1 are arranged with predetermined distance d2 therebetween in the Y direction.

[2-2. Effects]

In the second exemplary embodiment, first antenna board 40-1 and second antenna board 50-1 are arranged parallel to each other, and first antenna board 40-2 and second antenna board 50-2 are arranged parallel to each other.

With such a configuration, in the same manner as the first exemplary embodiment, compared to a case where antenna boards 40-1, 40-2, 50-1, 50-2 are arranged in series in a row without being arranged parallel to each other, a width (a length in the X direction) of upper casing 20 can be reduced so that upper casing 20 can be made compact. Accordingly, it is possible to prevent the increase in a size of the upper casing even when the plurality of antenna boards 40-1, 40-2, 50-1, 50-2 are accommodated in the upper casing.

Further, in the second exemplary embodiment, first antenna boards 40-1, 40-2 are arranged such that a pair of main surfaces of each of first antenna boards 40-1, 40-2 is parallel to one main surface of upper casing 20. Further, second antenna board 50-1, 50-2 are arranged such that a pair of main surfaces of each of second antenna boards 50-1, 50-2 is perpendicular to the one main surface of the upper casing.

With such a configuration, in the same manner as the first exemplary embodiment, electromagnetic coupling between the conductive portion of antenna board 40-1 and the conductive portion of antenna board 50-1 can be reduced, and electromagnetic coupling between the conductive portion of antenna board 40-2 and conductive portion of antenna board 50-2 can be reduced.

Third Exemplary Embodiment

An electronic apparatus according to a third exemplary embodiment of the present disclosure is described with reference to FIG. 24 to FIG. 27.

[3-1. Configuration]

Figure 24:
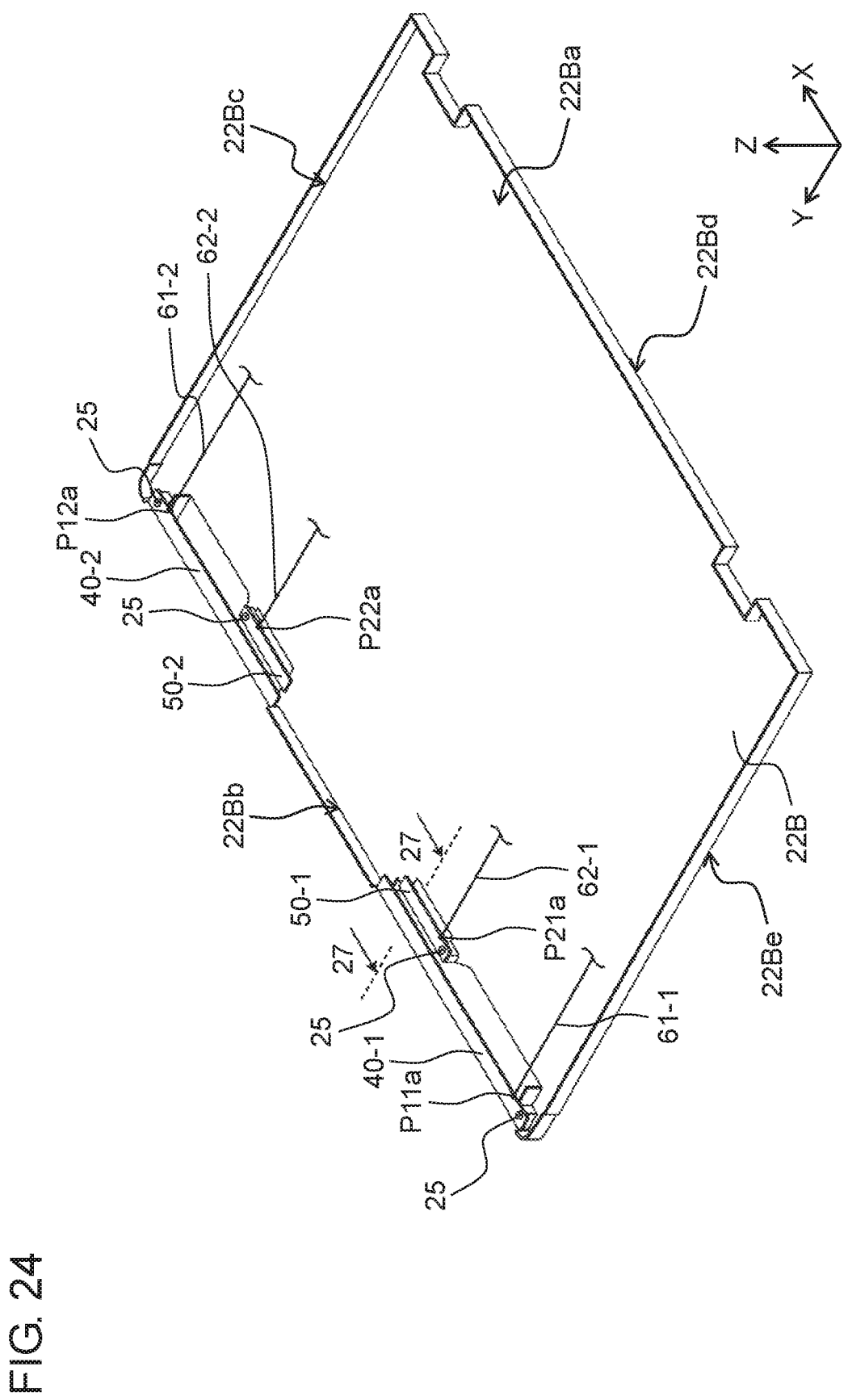
FIG. 24 is a perspective view showing an inner surface of a panel of an upper casing of an electronic apparatus according to a third exemplary embodiment of the present disclosure.
Figure 25:
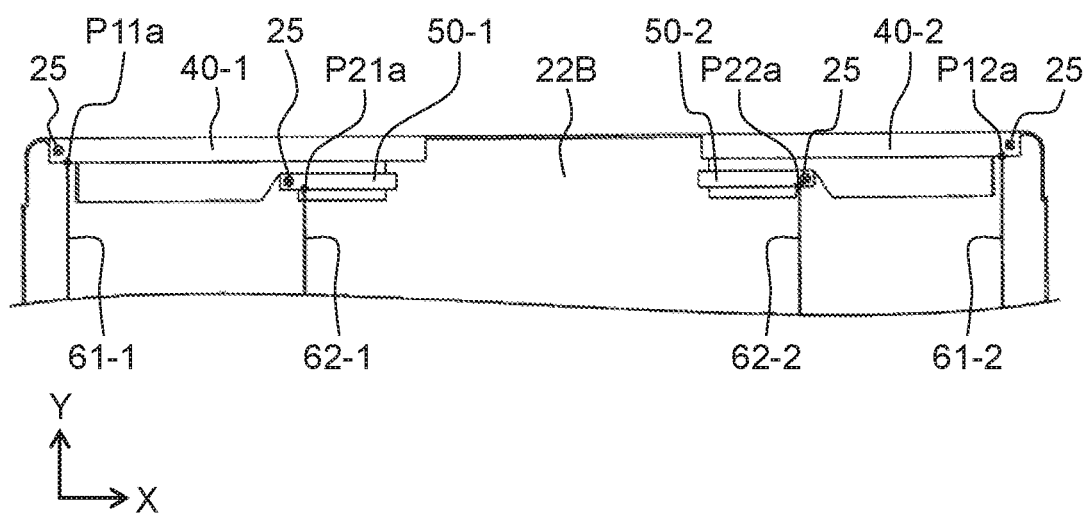
FIG. 25 is a plan view showing a portion of the inner surface of the panel of the upper casing of the electronic apparatus according to the third exemplary embodiment of the present disclosure.
Figure 26:
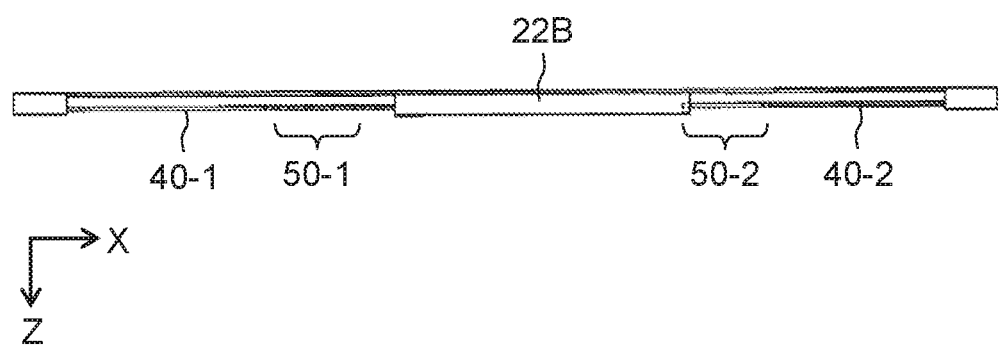
FIG. 26 is a side view showing an upper side surface of the panel of the upper casing of the electronic apparatus according to the third exemplary embodiment of the present disclosure.
Figure 27:
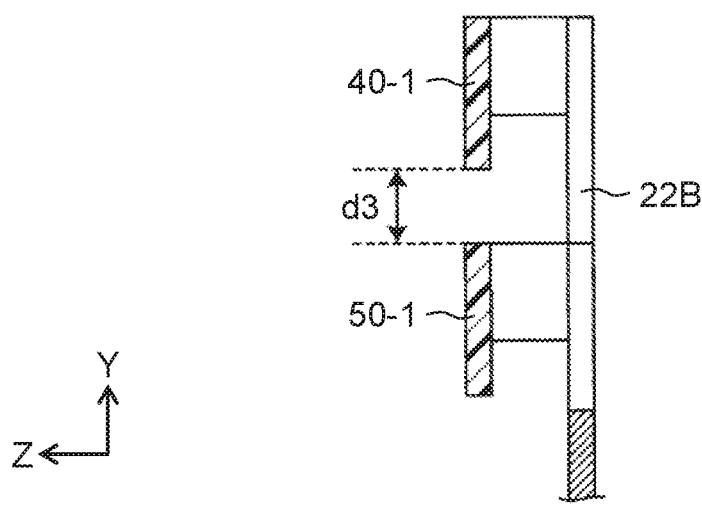
FIG. 27 is a cross-sectional view of the panel of the upper casing taken along line 27-27 in FIG. 24.

FIG. 24 is a perspective view showing an inner surface of panel 22B of an upper casing of the electronic apparatus according to the third exemplary embodiment of the present disclosure. FIG. 25 is a plan view showing a portion of the inner surface of panel 22B of the upper casing of the electronic apparatus according to the third exemplary embodiment of the present disclosure. FIG. 26 is a side view showing an upper side surface of panel 22B of the upper casing of the electronic apparatus according to the third exemplary embodiment of the present disclosure. FIG. 27 is a cross-sectional view of the panel of the upper casing taken along line 27-27 in FIG. 24. In the electronic apparatus according to the third exemplary embodiment, panel 22 of upper casing 20 of electronic apparatus 100 according to the first exemplary embodiment is replaced with panel 22B shown in FIG. 24 to FIG. 27.

Back surface 22Ba of panel 22B which is parallel to an XY plane forms one main surface of the upper casing. Panel 22B has a substantially rectangular shape as viewed in a plan view. Panel 22B has upper side 22Bb and lower side 22Bd which are parallel to the X axis, and right side 22Bc and left side 22Be which are parallel to the Y axis. Antenna boards 40-1, 40-2, 50-1, 50-2 are arranged such that longitudinal directions of antenna boards 40-1, 40-2, 50-1, 50-2 are parallel to upper side 22Bb of panel 22B.

Antenna board 40-1 and antenna board 50-1 are arranged parallel to each other. As shown in FIG. 24 and FIG. 25, antenna board 40-1 is fixed to panel 22B by screw 25. Antenna board 40-1 is arranged such that a pair of main surfaces of antenna board 40-1 is parallel to back surface 22Ba of panel 22B. As shown in FIG. 24 and FIG. 25, antenna board 50-1 is fixed to panel 22B by screw 25. Antenna board 50-1 is arranged such that a pair of main surfaces of antenna board 50-1 is parallel to back surface 22Ba of panel 22B.

Antenna board 40-2 and antenna board 50-2 are arranged parallel to each other. As shown in FIG. 24 and FIG. 25, antenna board 40-2 is fixed to panel 22B by screw 25. Antenna board 40-2 is arranged such that a pair of main surfaces of antenna board 40-2 is parallel to back surface 22Ba of panel 22B. As shown in FIG. 24 and FIG. 25, antenna board 50-2 is fixed to panel 22B by screw 25. Antenna board 50-2 is arranged such that a pair of main surfaces of antenna board 50-2 is parallel to back surface 22Ba of panel 22B.

As shown in FIG. 27, antenna board 40-1 and antenna board 50-1 are arranged with predetermined distance d3 therebetween in the Y direction.

[3-2. Effects]

In the third exemplary embodiment, first antenna board 40-1 and second antenna board 50-1 are arranged parallel to each other, and first antenna board 40-2 and second antenna board 50-2 are arranged parallel to each other.

With such a configuration, in the same manner as the first exemplary embodiment, compared to a case where antenna boards 40-1, 40-2, 50-1, 50-2 are arranged in series in a row without being arranged parallel to each other, a width (a length in the X direction) of upper casing 20 can be reduced so that upper casing 20 can be made compact. Accordingly, it is possible to prevent the increase in a size of the upper casing even when the plurality of antenna boards 40-1, 40-2, 50-1, 50-2 are accommodated in the upper casing.

Further, in the third exemplary embodiment, first antenna boards 40-1, 40-2 and second antenna boards 50-1, 50-2 are arranged such that respective pairs of main surfaces of first antenna boards 40-1, 40-2 and second antenna boards 50-1, 50-2 are parallel to one main surface of the upper casing.

With such a configuration, in the same manner as the first exemplary embodiment, electromagnetic coupling between the conductive portion of antenna board 40-1 and the conductive portion of antenna board 50-1 can be reduced, and electromagnetic coupling between the conductive portion of antenna board 40-2 and conductive portion of antenna board 50-2 can be reduced. In the third exemplary embodiment, an area where the conductive portion of each of antenna boards 40-1, 40-2 and the conductive portion of each of antenna boards 50-1, 50-2 opposedly face each other is minimized. Accordingly, compared to the case of the first and second exemplary embodiments, electromagnetic coupling can be further reduced. In the third exemplary embodiment, a size in the Z direction of a portion where first antenna boards 40-1, 40-2 and second antenna boards 50-1, 50-2 are arranged is minimized. Accordingly, a thickness in the Z direction of the upper casing which accommodates these antenna boards can be minimized.

Fourth Exemplary Embodiment

An electronic apparatus according to a fourth exemplary embodiment of the present disclosure is described with reference to FIG. 28 to FIG. 31.

[4-1. Configuration]

Figure 28:
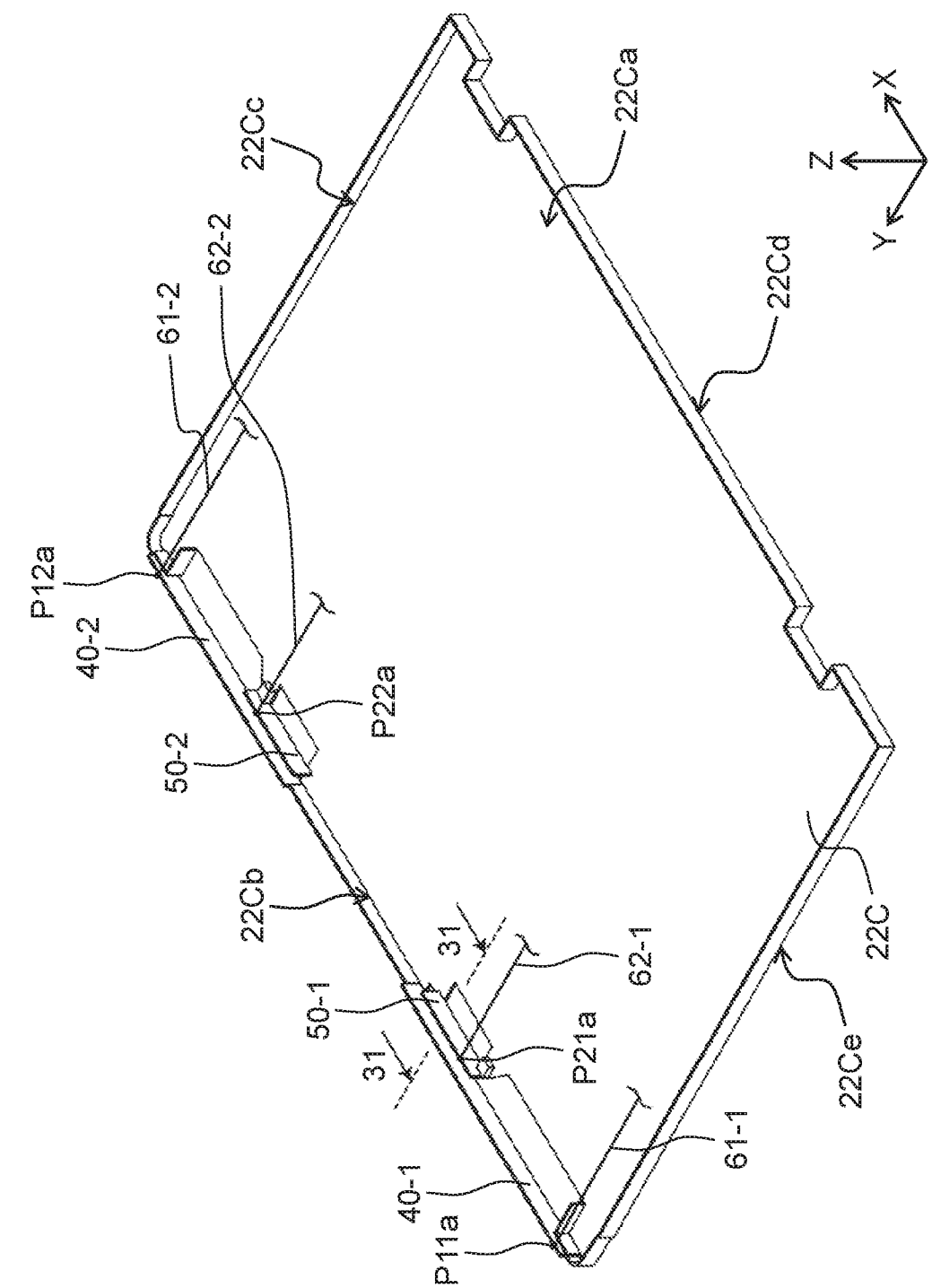
FIG. 28 is a perspective view showing an inner surface of a panel of an upper casing of an electronic apparatus according to a fourth exemplary embodiment of the present disclosure.
Figure 29:
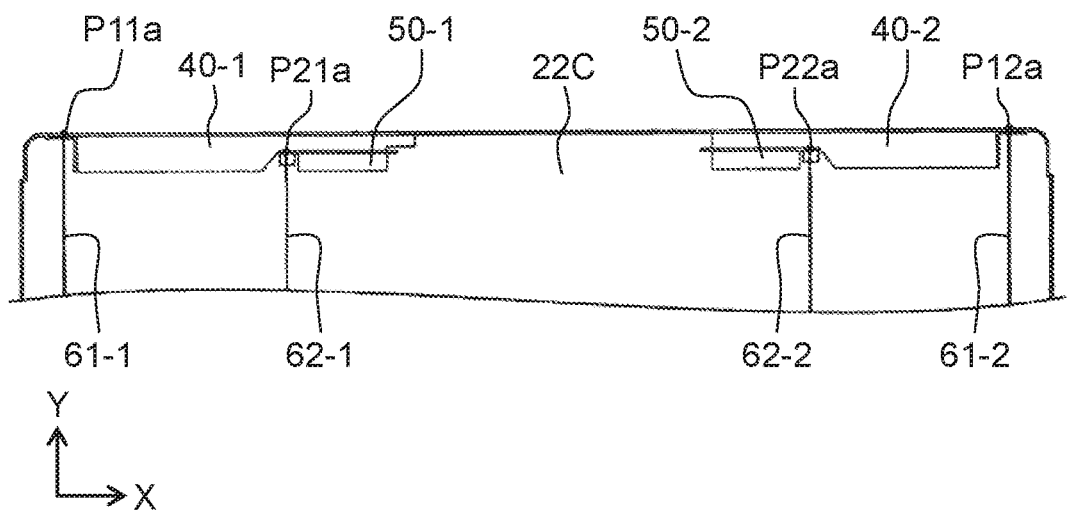
FIG. 29 is a plan view showing a portion of the inner surface of the panel of the upper casing of the electronic apparatus according to the fourth exemplary embodiment of the present disclosure.
Figure 30:
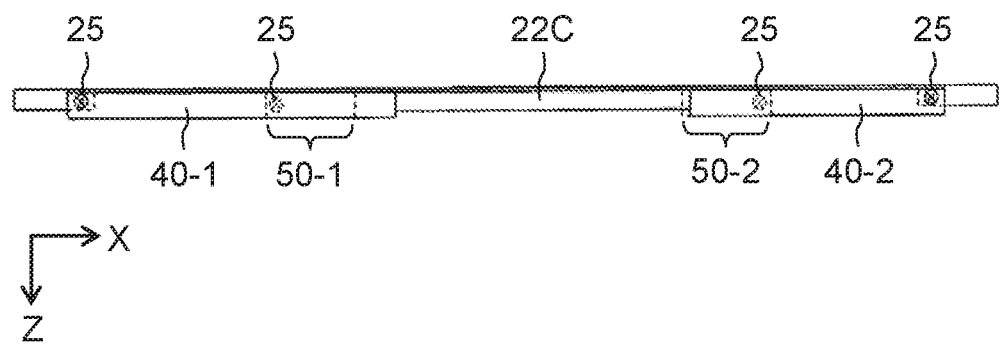
FIG. 30 is a side view showing an upper side surface of the panel of the upper casing of the electronic apparatus according to the fourth exemplary embodiment of the present disclosure.
Figure 31:
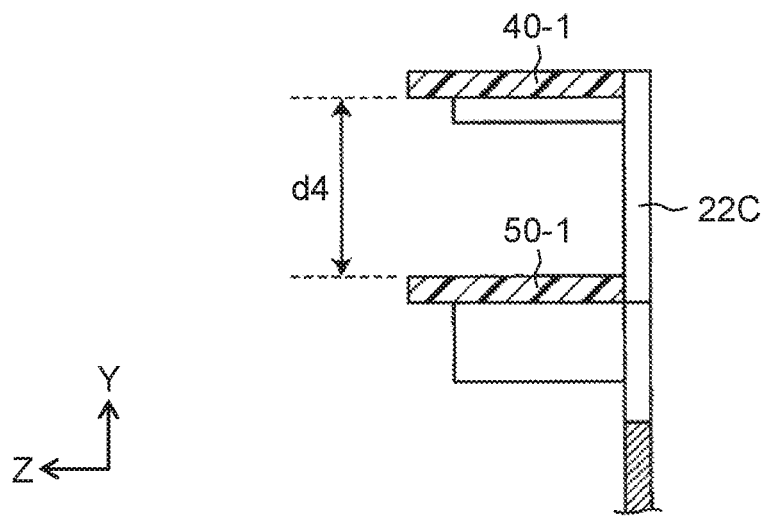
FIG. 31 is a cross-sectional view of the panel of the upper casing taken along line 31-31 in FIG. 28.

FIG. 28 is a perspective view showing an inner surface of panel 22C of an upper casing of the electronic apparatus according to the fourth exemplary embodiment of the present disclosure. FIG. 29 is a plan view showing a portion of the inner surface of panel 22C of the upper casing of the electronic apparatus according to the fourth exemplary embodiment of the present disclosure. FIG. 30 is a side view showing an upper side surface of panel 22C of the upper casing of the electronic apparatus according to the fourth exemplary embodiment of the present disclosure. FIG. 31 is a cross-sectional view of the panel of the upper casing taken along line 31-31 in FIG. 28. In the electronic apparatus according to the fourth exemplary embodiment, panel 22 of upper casing 20 of electronic apparatus 100 according to the first exemplary embodiment is replaced with panel 22A shown in FIG. 28 to FIG. 31.

Back surface 22Ca of panel 22C which is parallel to an XY plane forms one main surface of the upper casing. Panel 22C has a substantially rectangular shape as viewed in a plan view. Panel 22C has upper side 22Cb and lower side 22Cd which are parallel to the X axis, and right side 22Cc and left side 22Ce which are parallel to the Y axis. Antenna boards 40-1, 40-2, 50-1, 50-2 are arranged such that longitudinal directions of antenna boards 40-1, 40-2, 50-1, 50-2 are parallel to upper side 22Cb of panel 22C.

Antenna board 40-1 and antenna board 50-1 are arranged parallel to each other. As shown in FIG. 30, antenna board 40-1 is fixed to panel 22C by screw 25. Antenna board 40-1 is arranged such that a pair of main surfaces of antenna board 40-1 is perpendicular to back surface 22Ca of panel 22C. As shown in FIG. 30, antenna board 50-1 is fixed to panel 22C by screw 25. Antenna board 50-1 is arranged such that a pair of main surfaces of antenna board 50-1 is perpendicular to back surface 22Ca of panel 22C.

Antenna board 40-2 and antenna board 50-2 are arranged parallel to each other. As shown in FIG. 30, antenna board 40-2 is fixed to panel 22C by screw 25. Antenna board 40-2 is arranged such that a pair of main surfaces of antenna board 40-2 is perpendicular to back surface 22Ca of panel 22C. As shown in FIG. 30, antenna board 50-2 is fixed to panel 22C by screw 25. Antenna board 50-2 is arranged such that a pair of main surfaces of antenna board 50-2 is perpendicular to back surface 22Ca of panel 22C.

As shown in FIG. 31, antenna board 40-1 and antenna board 50-1 are arranged with predetermined distance d4 therebetween in the Y direction.

[4-2. Effects]

In the fourth exemplary embodiment, first antenna board 40-1 and second antenna board 50-1 are arranged parallel to each other, and first antenna board 40-2 and second antenna board 50-2 are arranged parallel to each other.

With such a configuration, in the same manner as the first exemplary embodiment, compared to a case where antenna boards 40-1, 40-2, 50-1, 50-2 are arranged in series in a row without being arranged parallel to each other, a width (a length in the X direction) of upper casing 20 can be reduced so that upper casing 20 can be made compact. Accordingly, it is possible to prevent the increase in a size of the upper casing even when the plurality of antenna boards 40-1, 40-2, 50-1, 50-2 are accommodated in the upper casing.

Further, in the fourth exemplary embodiment, first antenna boards 40-1, 40-2 and second antenna boards 50-1, 50-2 are arranged such that respective pairs of main surfaces of each of first antenna boards 40-1, 40-2 and each of second antenna boards 50-1, 50-2 are perpendicular to one main surface of the upper casing.

With such a configuration, compared to the case of the third exemplary embodiment, a size in the Y direction of a portion where first antenna boards 40-1, 40-2 and second antenna boards 50-1, 50-2 are arranged can be reduced. Accordingly, the upper casing which accommodates these antenna boards can be made compact.

Other Exemplary Embodiments

As has been described above, the first to fourth exemplary embodiments have been described as examples of the technique disclosed in the present application. However, the technique of the present disclosure is not limited to these exemplary embodiments, and is also applicable to other exemplary embodiments in which, for example, a modification, a replacement, an addition, and an omission of the above-mentioned embodiments are appropriately made. New exemplary embodiments can also be made by combining the respective components described in the first to fourth exemplary embodiments with other components described in the first to fourth exemplary embodiments.

In the first to fourth exemplary embodiments, to realize spatial diversity, first antenna boards 40-1, 40-2 are operated in the same frequency band, and second antenna boards 50-1, 50-2 are operated in the same frequency band. However, the present disclosure is not limited to such a configuration. One of first antenna boards 40-1, 40-2 may be operated in an additional frequency band (for example, a frequency band for receiving a global positioning system (GPS)), and one of second antenna boards 50-1, 50-2 may be operated in an additional frequency band. First antenna boards 40-1, 40-2 may be operated in different frequency bands, and second antenna boards 50-1, 50-2 may be operated in different frequency bands.

The configuration of first antenna board 40-1, 40-2 is not limited to the configuration described with reference to FIG. 8 to FIG. 13.

For example, a shape of each of dielectric substrates 41, 51 is not limited to a rectangular shape, and may be an arbitrary shape including another polygonal shape, a shape with a curved line or the like.

For example, in antenna boards 40-1, 40-2, the portion having a meandering shape may be shorter or longer than the example shown in FIG. 8 to FIG. 10. With respect to the structure of the portion having a meandering shape, the portion can be formed in conformity with a resonance frequency at which LC resonator 46 is desired to resonate. The portion having a meandering shape may be formed in radiating element 42 instead of radiating element 43 or may be formed in both radiating elements 42, 43.

For example, with respect to through hole conductors which electrically connect radiating elements 42, 43 with each other, at least one through hole conductor may be disposed at a position different from a position shown in FIG. 8 to FIG. 10.

For example, radiating element 44 may be removed from antenna boards 40-1, 40-2, and antenna boards 40-1, 40-2 may be operated only at first low frequency f1a and second low frequency f1b.

The configuration of second antenna boards 50-1, 50-2 is also not limited to the configuration described with reference to FIG. 14 to FIG. 18.

For example, second antenna board 50-1, 50-2 may be operated at a single frequency.

In the first to fourth exemplary embodiments, the description has been made by taking the case where the panels 22, 22A to 22C are made of a magnesium alloy as an example. However, the present disclosure is not limited to such a configuration. Panels 22, 22A to 22C may be made of other metal such as aluminum, or may be made of a non-metal material.

In the first to fourth exemplary embodiments, the description has been made by taking the case where electronic apparatus 100 is a notebook computer as an example. However, the present disclosure is not limited to such a configuration. The present disclosure is applicable to an arbitrary electronic apparatus provided with a casing which accommodates a plurality of antennas. For example, the electronic apparatus may be a portable electronic apparatus such as a tablet personal computer, a cellular phone, a game machine, a digital still camera, a digital video camera, a television receiver, a Blu-ray disc player or a navigation system. Further, the electronic apparatus may be a stationary electronic apparatus such as a desktop computer or a liquid crystal projector, for example.

In the first to fourth exemplary embodiments, the description has been made by taking the case where the casing is upper casing 20 of a notebook computer as an example. However, the present disclosure is not limited to such a configuration. The present disclosure is applicable to an arbitrary casing of an arbitrary electronic apparatus which accommodates a plurality of antennas.

The exemplary embodiments have been described heretofore for exemplifying the technique of the present disclosure. The accompanying drawings and detailed description have been provided for this purpose.

Accordingly, the components described in the appended drawings and the detailed description include not only components essential for solving the above problem, but may also include components that are not essential for solving the above problem so as to exemplify the above-mentioned technique. Therefore, it should not be immediately construed that these components that are not essential are essential even if the components are described in the accompanying drawings and the detailed description.

Since the above described exemplary embodiments are for exemplifying the technique of the present disclosure, various modifications, replacements, additions, and omissions can be made within the scope of the appended claims or of their equivalents.

The present disclosure is applicable to an arbitrary electronic apparatus provided with a casing which accommodates a plurality of antennas.

What is claimed is:

1. An electronic apparatus comprising:
    a first antenna board having a plate shape and extending with a first length;
    a second antenna board having a plate shape and extending with a second length; and
    a casing, having a rectangular parallelepiped shape, for accommodating the first antenna board and the second antenna board in an inner area of a main surface and side surfaces,
    wherein the first antenna board and the second antenna board are arranged such that a longitudinal direction of the first antenna board and a longitudinal direction of the second antenna board are parallel to an extending direction of one of the side surfaces of the casing, and the first antenna board and the second antenna board are arranged parallel to each other, wherein:
    the first antenna board is arranged such that a pair of main surfaces of the first antenna board is perpendicular to the main surface of the casing, the second antenna board is arranged such that a pair of main surfaces of the second antenna board is parallel to the main surface of the casing, the pair of main surfaces of the first antenna board are perpendicular to the pair of main surfaces of the second antenna board, and wherein the first antenna board includes two planar radiating elements capacitively coupled to each other.

2. The electronic apparatus according to claim 1, wherein the first antenna board is operated in a first frequency band, the second antenna board is operated in a second frequency band higher than the first frequency band, and the second length is shorter than the first length.

3. The electronic apparatus according to claim 2, wherein the first antenna board comprises:

a first dielectric substrate;

a first feedpoint disposed at a predetermined position of the first dielectric substrate; and a first radiating element of the two planar radiating elements formed on at least one of a pair of main surfaces of the first dielectric substrate, the first radiating element being formed along the longitudinal direction of the first antenna board with a third length shorter than the first length, the second antenna board comprises:

a second dielectric substrate;

a second feedpoint disposed at a predetermined position of the second dielectric substrate; and a second radiating element formed on at least one of a pair of main surfaces of the second dielectric substrate, the second radiating element being formed along the longitudinal direction of the second antenna board with a fourth length shorter than the second length, and the first radiating element includes a first zone and a second zone along the longitudinal direction of the first antenna board, the first radiating element being connected to the first feedpoint in the first zone, and opposedly facing the second radiating element only in at least a portion of the second zone.

4. The electronic apparatus according to claim 3, wherein the first radiating element is configured to wholly resonate during an operation of the first antenna board at a first frequency within the first frequency band, and the first zone of the first radiating element is configured to resonate during an operation of the first antenna board at a second frequency higher than the first frequency within the first frequency band.

5. The electronic apparatus according to claim 4, wherein the first antenna board includes an LC resonator between the first zone and the second zone of the first radiating element.

6. The electronic apparatus according to claim 1, wherein one of the two planar radiating elements has a meandering structure.

7. An electronic apparatus comprising:

a first antenna board having a plate shape and extending with a first length;

a second antenna board having a plate shape and extending with a second length; and a casing, having a rectangular parallelepiped shape, for accommodating the first antenna board and the second antenna board in an inner area of a main surface and side surfaces, wherein the first antenna board and the second antenna board are arranged such that a longitudinal direction of the first antenna board and a longitudinal direction of the second antenna board are parallel to an extending direction of one of the side surfaces of the casing, and the first antenna board and the second antenna board are arranged parallel to each other, wherein:

the first antenna board is arranged such that a pair of main surfaces of the first antenna board is perpendicular to the main surface of the casing, the second antenna board is arranged such that a pair of main surfaces of the second antenna board is parallel to the main surface of the casing, the pair of main surfaces of the first antenna board are perpendicular to the pair of main surfaces of the second antenna board, and wherein the first antenna board includes two radiating elements with one of the two radiating elements having a meandering structure.

8. The electronic apparatus according to claim 7, wherein the first antenna board is operated in a first frequency band, the second antenna board is operated in a second frequency band higher than the first frequency band, and the second length is shorter than the first length.

9. The electronic apparatus according to claim 8, wherein the first antenna board comprises:

a first dielectric substrate;

a first feedpoint disposed at a predetermined position of the first dielectric substrate; and a first radiating element of the two radiating elements formed on at least one of a pair of main surfaces of the first dielectric substrate, the first radiating element being formed along the longitudinal direction of the first antenna board with a third length shorter than the first length, the second antenna board comprises:

a second dielectric substrate;

a second feedpoint disposed at a predetermined position of the second dielectric substrate; and a second radiating element formed on at least one of a pair of main surfaces of the second dielectric substrate, the second radiating element being formed along the longitudinal direction of the second antenna board with a fourth length shorter than the second length, and the first radiating element includes a first zone and a second zone along the longitudinal direction of the first antenna board, the first radiating element being connected to the first feedpoint in the first zone, and opposedly facing the second radiating element only in at least a portion of the second zone.

10. The electronic apparatus according to claim 9, wherein the first radiating element is configured to wholly resonate during an operation of the first antenna board at a first frequency within the first frequency band, and the first zone of the first radiating element is configured to resonate during an operation of the first antenna board at a second frequency higher than the first frequency within the first frequency band.

11. The electronic apparatus according to claim 10, wherein the first antenna board includes an LC resonator between the first zone and the second zone of the first radiating element.

12. The electronic apparatus according to claim 7, wherein the two radiating elements are planar and capacitively coupled to each other.

* * * * *